US010740297B2

United States Patent
Knotts et al.

(10) Patent No.: US 10,740,297 B2
(45) Date of Patent: Aug. 11, 2020

(54) ADAPTIVE TOOL SELECTION FOR CONFLICT RESOLUTION IN A MULTI-SESSION COLLABORATION SETTING

(71) Applicant: Box, Inc., Los Altos, CA (US)

(72) Inventors: Ryan Knotts, San Jose, CA (US); Varun Gupta, Sunnyvale, CA (US)

(73) Assignee: Box, Inc., Redwood City, CA (US)

(*) Notice: Subject to any disclaimer, the term of this patent is extended or adjusted under 35 U.S.C. 154(b) by 372 days.

(21) Appl. No.: 14/973,549

(22) Filed: Dec. 17, 2015

(65) Prior Publication Data

US 2017/0177610 A1 Jun. 22, 2017

(51) Int. Cl.
G06F 3/0481 (2013.01)
G06F 16/176 (2019.01)
H04L 29/06 (2006.01)
G06F 40/166 (2020.01)

(52) U.S. Cl.
CPC ........ G06F 16/1767 (2019.01); G06F 3/0481 (2013.01); G06F 40/166 (2020.01); H04L 65/403 (2013.01)

(58) Field of Classification Search
CPC .. G06F 3/0482; G06F 3/04842; G06F 3/0481; H04L 65/403
See application file for complete search history.

(56) References Cited

U.S. PATENT DOCUMENTS 5,438,661 A * 8/1995 Ogawa ................. G06F 3/0481
715/259
5,966,121 A * 10/1999 Hubbell ............... H04N 21/435
375/E7.024
7,430,744 B2 * 9/2008 Straube ............. G06F 17/30215
707/E17.032
7,526,513 B2 * 4/2009 Lees ................. G06F 17/30351
7,949,938 B2 * 5/2011 Champion ........... G06F 17/243
715/209
8,117,344 B2 * 2/2012 Mendez ................. G06Q 10/10
709/203

(Continued)

OTHER PUBLICATIONS

"What's a conflicted copy?—Dropbox Help", URL: https://www.dropbox.com/help/syncing-uploads/conflicted-copy, Dec. 2014, Accessed on Jul. 9, 2018.

Primary Examiner — Phenuel S Salomon
(74) Attorney, Agent, or Firm — Vista IP Law Group, LLP

(57) ABSTRACT

Systems for web-based collaboration systems. Two or more users can operate concurrently on objects stored in a cloud-based environment that hosts shared objects. Concurrent editing is facilitated by components in the cloud-based environment that serve to grant a first user, a first permission to modify a first instance of an object to be edited with a first editing tool, then grant to a second user, a second permission to modify a second instance of the same object to be edited with a second editing tool instance. The occurrence of a modification event that presents a conflict is detected, and steps are taken for determining a range of possible remediation tool options that can be used to address the modification conflict. Remediation tool options include remediation tool options that are natively supported within the editing tools. A set of applicable remediation tool options are presented in a user interface.

20 Claims, 16 Drawing Sheets

(56) References Cited

U.S. PATENT DOCUMENTS

| | | | | |
|---|---|---|---|---|
| 8,276,096 B2* | 9/2012 | Plow | | G06F 17/2211 |
| | | | | 715/229 |
| 8,504,519 B1* | 8/2013 | Sachs | | G06F 8/71 |
| | | | | 707/616 |
| 8,683,380 B2* | 3/2014 | Plow | | G06F 17/2211 |
| | | | | 715/804 |
| 8,719,728 B2* | 5/2014 | Plow | | G06F 17/2211 |
| | | | | 715/781 |
| 8,825,597 B1* | 9/2014 | Houston | | H04L 67/06 |
| | | | | 707/610 |
| 9,369,431 B1* | 6/2016 | Kirby | | H04L 63/02 |
| 9,836,490 B2* | 12/2017 | Greenberg | | G06F 16/2246 |
| 2002/0065848 A1* | 5/2002 | Walker | | G06F 17/24 |
| | | | | 715/205 |
| 2004/0073560 A1* | 4/2004 | Edwards | | G06F 17/30176 |
| 2004/0243930 A1* | 12/2004 | Schowtka | | G06F 17/248 |
| | | | | 715/243 |
| 2005/0044518 A1* | 2/2005 | Petunin | | G06F 17/5068 |
| | | | | 716/119 |
| 2005/0177617 A1* | 8/2005 | Banginwar | | H04L 67/1095 |
| | | | | 709/203 |
| 2005/0210465 A1* | 9/2005 | Sasaki | | G06F 8/65 |
| | | | | 717/175 |
| 2006/0002681 A1* | 1/2006 | Spilo | | H04N 5/76 |
| | | | | 386/220 |
| 2006/0200599 A1* | 9/2006 | Manchester | | G06F 17/30194 |
| | | | | 710/62 |
| 2007/0067373 A1* | 3/2007 | Higgins | | G06F 11/3013 |
| 2007/0180084 A1* | 8/2007 | Mohanty | | G06F 11/1451 |
| | | | | 709/223 |
| 2007/0250705 A1* | 10/2007 | Smith | | G06Q 30/0266 |
| | | | | 713/157 |
| 2007/0255694 A1* | 11/2007 | Wu | | G06F 16/951 |
| 2008/0114830 A1* | 5/2008 | Welingkar | | G06F 17/30575 |
| | | | | 709/203 |
| 2008/0263442 A1* | 10/2008 | Plumley | | G06F 17/2288 |
| | | | | 715/255 |
| 2009/0077263 A1* | 3/2009 | Koganti | | H04L 67/1095 |
| | | | | 709/248 |
| 2009/0157608 A1* | 6/2009 | Strathearn | | G06F 16/40 |
| 2009/0199090 A1* | 8/2009 | Poston | | G06F 17/30997 |
| | | | | 715/255 |
| 2012/0016899 A1* | 1/2012 | Kumar | | G06F 16/256 |
| | | | | 707/769 |
| 2012/0233555 A1* | 9/2012 | Psistakis | | G06Q 10/101 |
| | | | | 715/751 |
| 2012/0310762 A1* | 12/2012 | Robbin | | G06Q 30/06 |
| | | | | 705/26.1 |
| 2012/0331108 A1* | 12/2012 | Ferdowsi | | H04L 67/06 |
| | | | | 709/219 |
| 2013/0013812 A1* | 1/2013 | Kessel | | G06Q 10/10 |
| | | | | 709/248 |
| 2013/0067594 A1* | 3/2013 | Kantor | | G06F 21/6218 |
| | | | | 726/28 |
| 2013/0124956 A1* | 5/2013 | Hatfield | | G06F 17/2288 |
| | | | | 715/211 |
| 2014/0092424 A1* | 4/2014 | Grosz | | H04L 67/42 |
| | | | | 358/1.15 |
| 2014/0096041 A1* | 4/2014 | Gowen | | G06F 3/1242 |
| | | | | 715/753 |
| 2014/0215303 A1* | 7/2014 | Grigorovitch | | G06F 16/972 |
| | | | | 715/229 |
| 2015/0012489 A1* | 1/2015 | Ceribelli | | G06F 16/2308 |
| | | | | 707/611 |
| 2015/0012528 A1* | 1/2015 | Kapadia | | G06F 17/2288 |
| | | | | 707/722 |
| 2015/0112927 A1 | 4/2015 | Lee et al. | | |
| 2015/0215399 A1* | 7/2015 | Oh | | G06F 17/30174 |
| | | | | 709/219 |
| 2015/0370769 A1* | 12/2015 | Pereira Filho | | G06F 16/93 |
| | | | | 726/28 |
| 2016/0267112 A1* | 9/2016 | Clissold | | G06F 17/30309 |
| 2017/0024365 A1 | 1/2017 | Emerick et al. | | |
| 2017/0123864 A1 | 5/2017 | Knotts et al. | | |

\* cited by examiner

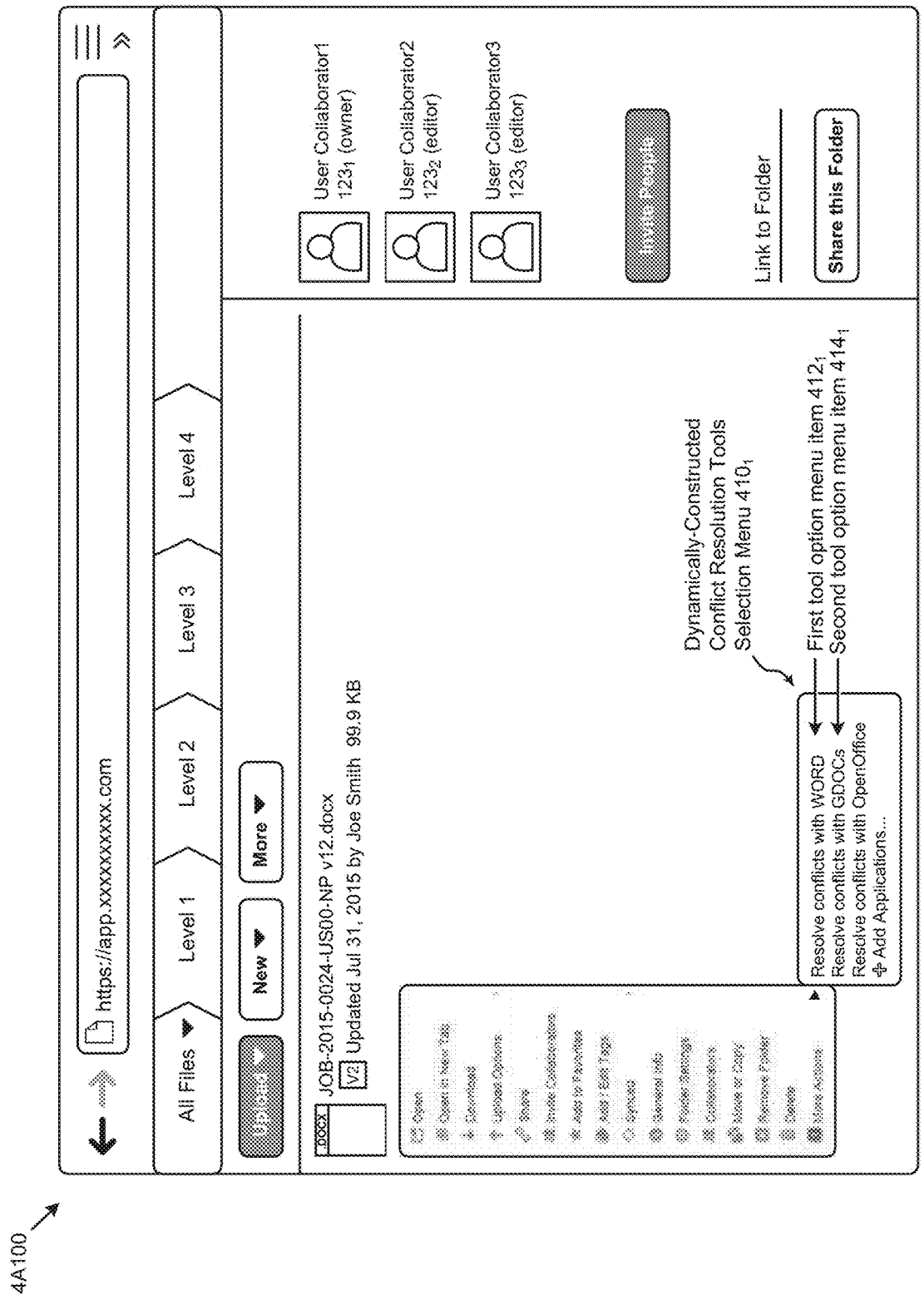
FIG. 4A1

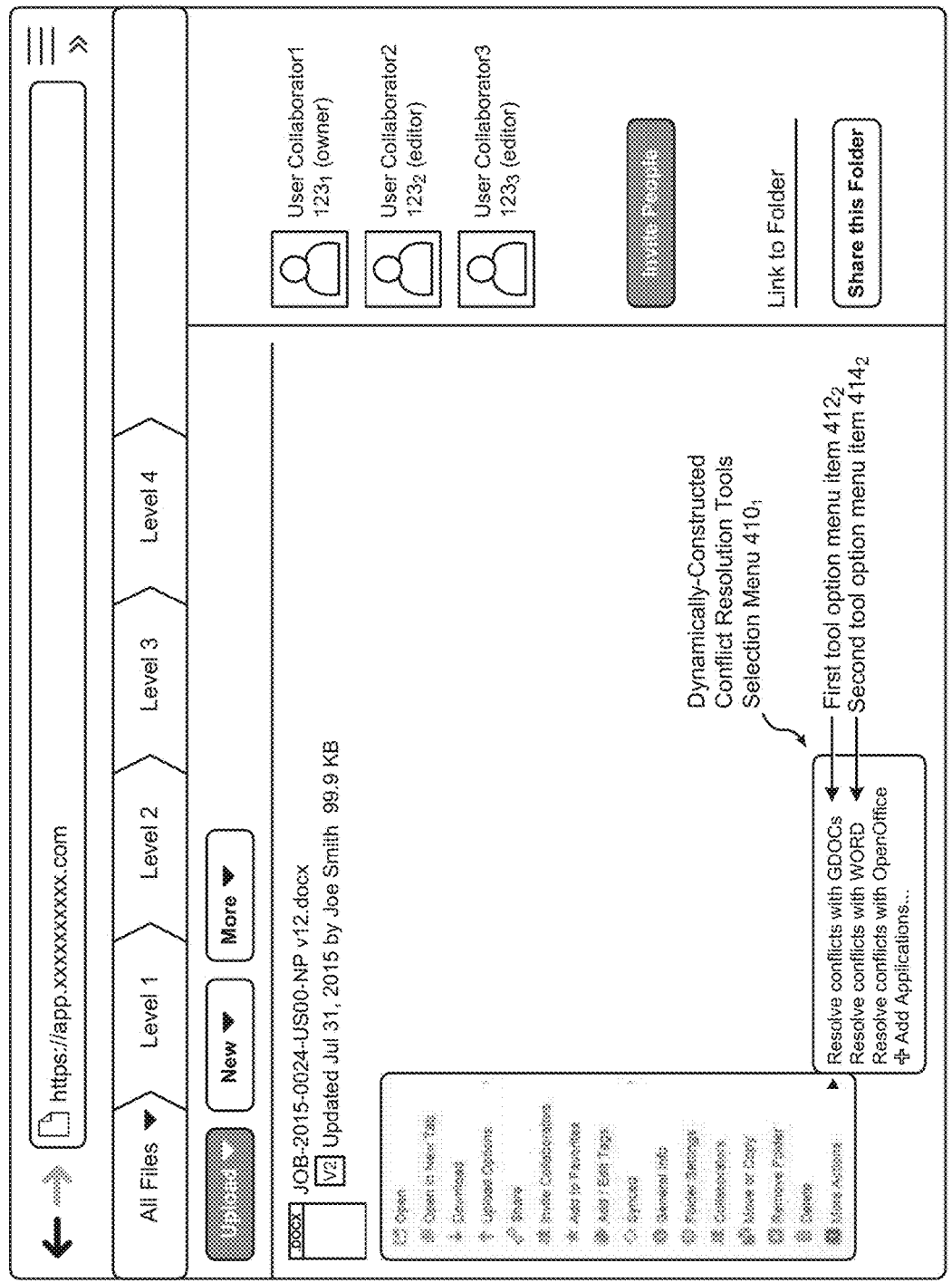
FIG. 4A2

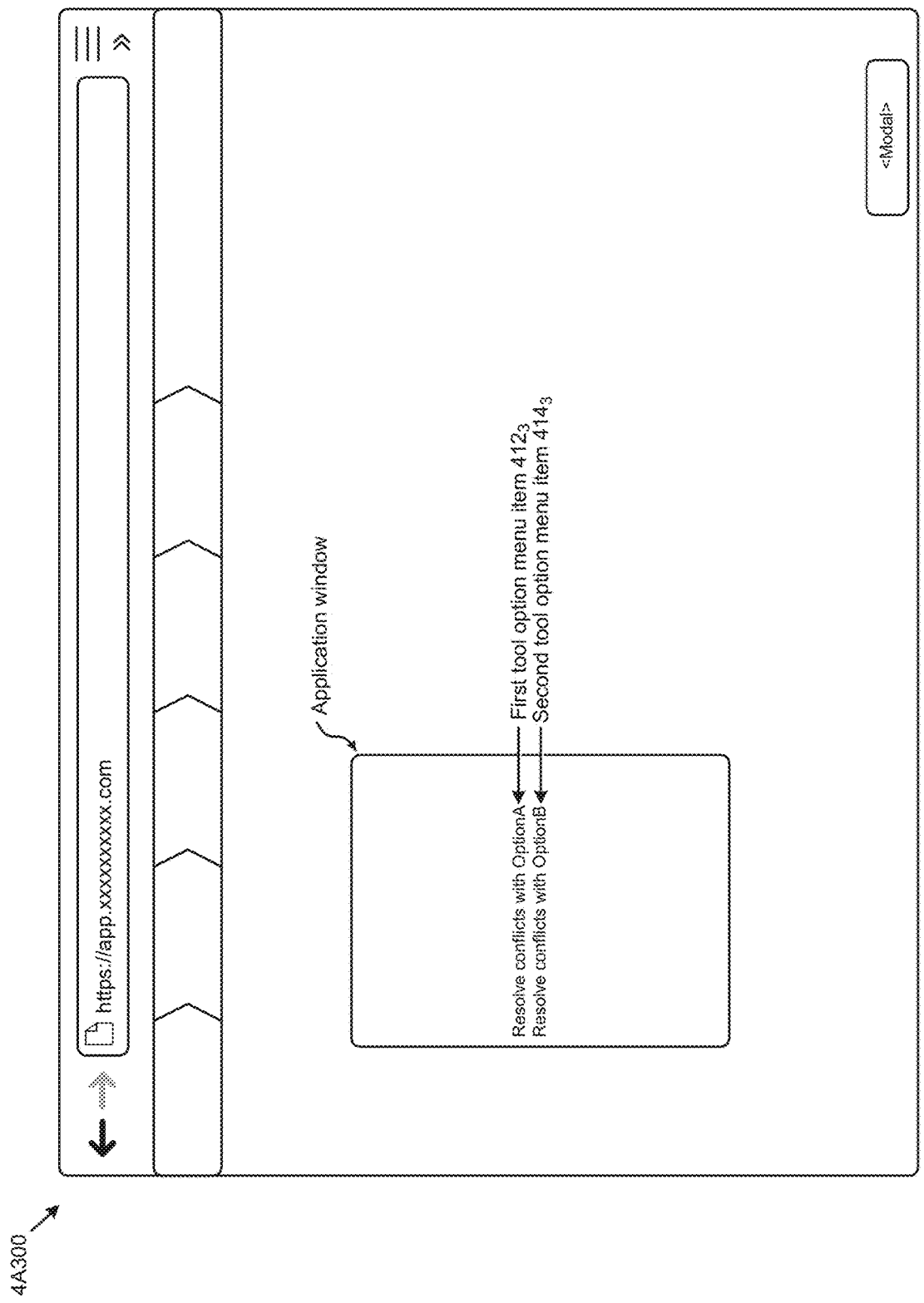
FIG. 4A3

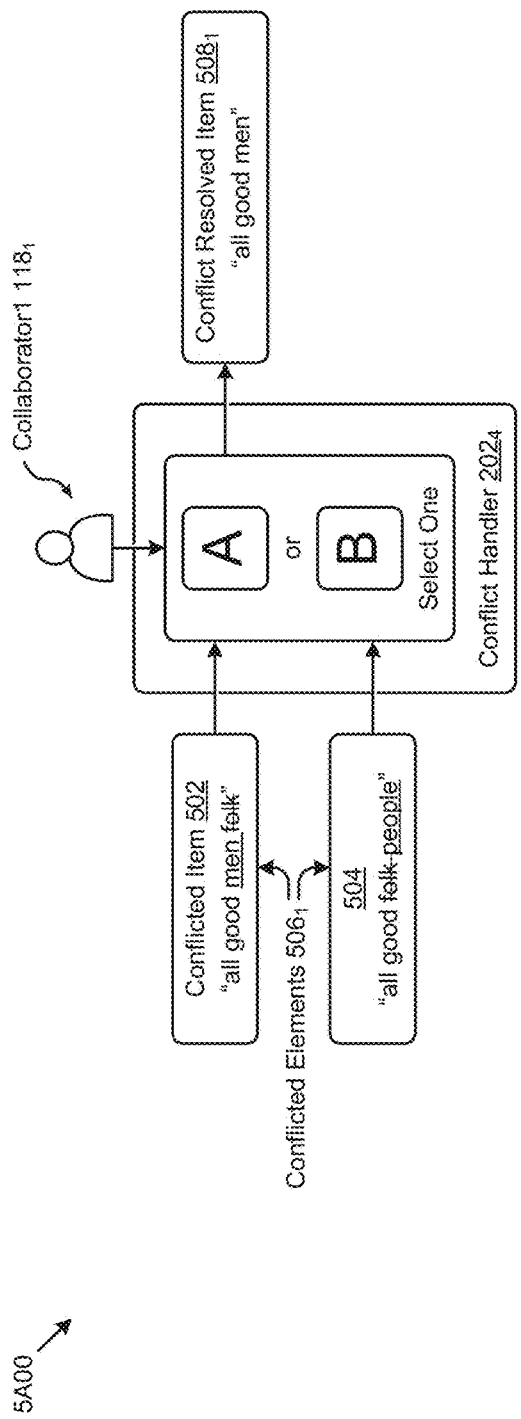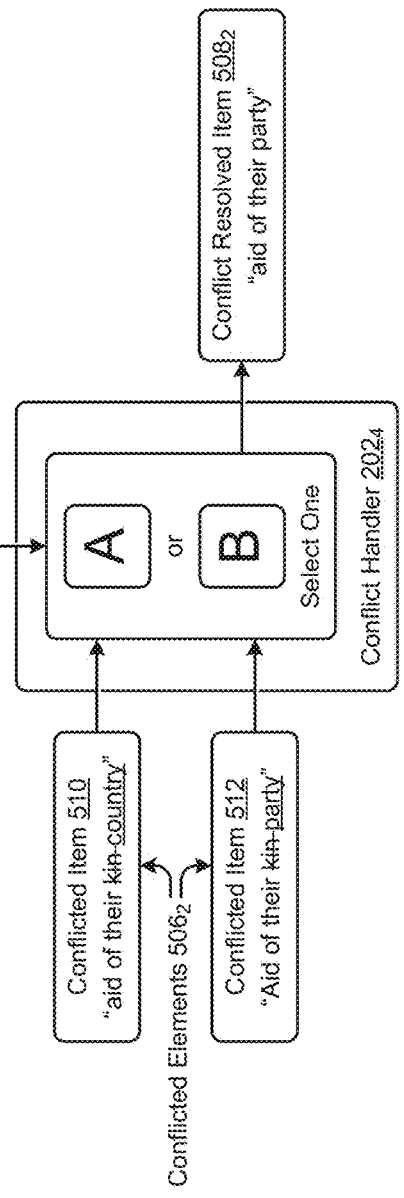
FIG. 5A
FIG. 5B

ADAPTIVE TOOL SELECTION FOR CONFLICT RESOLUTION IN A MULTI-SESSION COLLABORATION SETTING

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

This disclosure relates to web-based collaboration systems, and more particularly to techniques for recommending conflict resolution tools used in remediation of object edit conflicts that arise from concurrent editing sessions.

BACKGROUND

Cloud-based sharing of files and other objects is a boon to those who collaborate on ideas and projects. Advances in computing capabilities (e.g., high-power client devices) and networking (e.g., high-speed, low latency communication) has facilitated dynamic exchange of ideas, even when working on the same documents or objects. In some environments two or more collaborators can work on the same objects at the same time. When two or more collaborators work on the same document at the same time, it is possible that the changes that two collaborator make each pertains to a different part of the shared document, and no conflicts arise. It is also possible that changes made by two or more simultaneously collaborating users include changes to the same parts of a shared document. In such situations, conflicts (e.g., editing conflicts) can arise. Legacy techniques to aid in conflict resolution assume that all simultaneously collaborating users use the same editing tool (e.g., Microsoft Word). In the process of conflict resolution, one of the simultaneously collaborating users would rely on the conflict resolution helpers (e.g., redline revisions tool) available from the editing tool. Unfortunately, it often happens that the simultaneously collaborating users use different editing tools (e.g., one user uses Microsoft Word, another user uses OpenOffice, another uses Lotus Notes, another user uses VI or eMacs, etc.). It also happens that simultaneously collaborating users use different editing tools at different times (e.g., while editing from a Windows platform, or while editing from a Linux platform, etc.), and/or when editing different types of documents. Legacy collaboration tools are unable to determine what tools should be used by which users at which times so as to facilitate resolution of conflicts that are introduced by simultaneously collaborating users.

What is needed is a technique or techniques to improve over legacy approaches.

SUMMARY

The present disclosure provides a detailed description of techniques used in systems, methods, and in computer program products for recommendation of conflict resolution tools used in conflict remediation.

The present disclosure provides systems, methods, and computer program products suited to address the aforementioned issues with legacy approaches. More specifically, the present disclosure provides a detailed description of techniques used in systems, methods, and in computer program products for adaptive tool selection for conflict resolution in a multi-session collaboration setting. Certain embodiments are directed to technological solutions for presenting choices of remediation tools to collaborating users based on user profiles and online environmental conditions, which embodiments advance the relevant technical fields, as well as advancing peripheral technical fields. The disclosed embodiments modify and improve over legacy approaches. In particular, the herein-disclosed techniques provide technical solutions that address the technical problems attendant to collaboration session management functions that need to determine what tools should be used by which users at which times so as to facilitate resolution of conflicts that are introduced by simultaneously collaborating users.

Two or more users can operate concurrently on objects stored in a cloud-based environment that hosts shared objects. Concurrent editing is facilitated by components in the cloud-based environment that serve to grant to a first user, a first permission to modify a first instance of an object to be edited with a first editing tool, then grant to a second user, a second permission to modify a second instance of the same object to be edited with a second editing tool. An occurrence of a modification event that presents a modification conflict is detected, and steps are taken for determining a range of possible remediation tool options that can be used to address the modification conflict. Remediation tool options include remediation tool options that are natively-supported within the editing tools. A set of remediation tool options are presented to one of the users.

Further details of aspects, objectives, and advantages of the technological embodiments are described herein in the following descriptions, drawings, and claims.

BRIEF DESCRIPTION OF THE DRAWINGS

The drawings described below are for illustration purposes only. The drawings are not intended to limit the scope of the present disclosure.

FIG. 4A1 depicts a presentation of a set of menu options pertaining to text-oriented conflict resolution tools used in user-directed conflict remediation, according to an embodiment.

FIG. 4A2 depicts a workspace showing a presentation of a user-specific set of menu options pertaining to text-oriented conflict resolution tools used in user-directed conflict remediation, according to an embodiment.

FIG. 4A3 depicts a remediation tool showing an in-application presentation of a user-specific set of menu options pertaining to text-oriented conflict resolution tools used in user-directed conflict remediation, according to an embodiment.

FIG. 5A and FIG. 5B present user interactions with a recommended conflict resolution tool that was selected to remediate conflicting text elements, according to an embodiment.

DETAILED DESCRIPTION

Figure 1A:
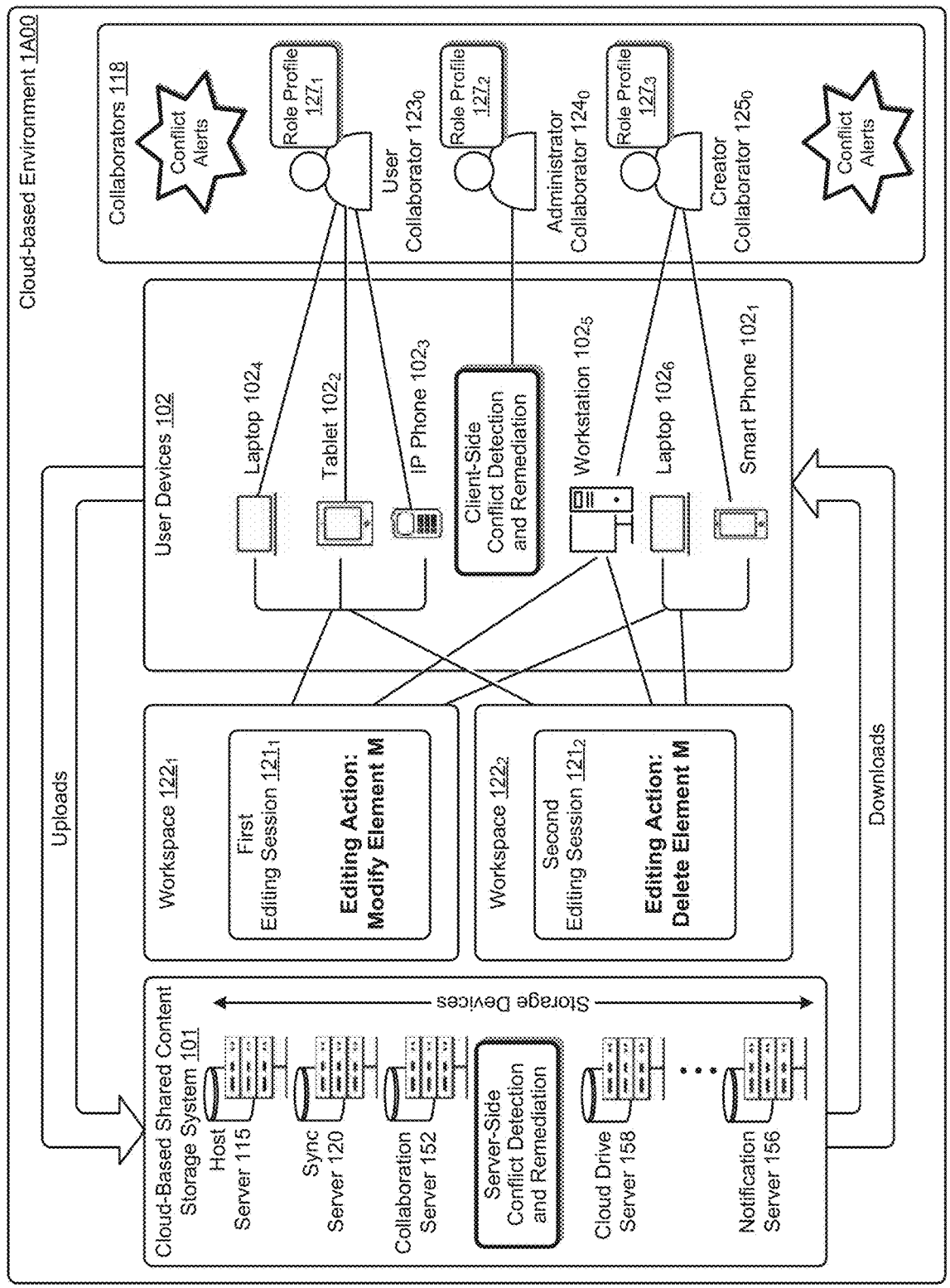
FIG. 1A depicts a cloud-based environment showing multiple editing sessions that introduce conflicts to be remediated by selected conflict resolution tools.

Some embodiments of the present disclosure address the problems that arise when collaboration tools need to determine what tools should be used by which users at which times so as to facilitate resolution of conflicts that are introduced by the simultaneously collaborating users. More particularly, disclosed herein and in the accompanying figures are exemplary environments, systems, methods, and computer program products for adaptive tool selection for conflict resolution in a multi-session collaboration setting.

OVERVIEW

Concurrently-collaborating users use different editing tools at different times (e.g., while editing from a Windows platform, or while editing from a Linux platform, etc.), and/or when editing different types of documents, and/or when editing from types of devices (e.g., a smart phone, a tablet, etc.). Legacy collaboration tools are unable to determine what tools should be used by which users at which times so as to facilitate resolution of conflicts that are introduced by simultaneously collaborating users.

Various embodiments are described herein with reference to the figures. It should be noted that the figures are not necessarily drawn to scale and that the elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment. An aspect or an advantage described in conjunction with a particular embodiment is not necessarily limited to that embodiment and can be practiced in any other embodiments even if not so illustrated. Also, reference throughout this specification to "some embodiments" or "other embodiments" refers to a particular feature, structure, material, or characteristic described in connection with the embodiments as being included in at least one embodiment. Thus, the appearances of the phrase "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

DESCRIPTIONS OF EXEMPLARY EMBODIMENTS

FIG. 1A depicts a cloud-based environment 1A00 showing multiple editing sessions that introduce conflicts to be remediated by selected conflict resolution tools.

The depicted embodiment of cloud-based environment 1A00 includes concurrently active workspaces (e.g., workspace $122_1$, workspace $122_2$). Shown within each of the workspaces are respective editing sessions (e.g., first editing session $121_1$ and second editing session $121_2$). Also depicted is a set of users (e.g., collaborators 118) that use various instances or types of user devices 102 (e.g., a smart phone $102_1$, a tablet $102_2$, an IP phone $102_3$, laptop $102_4$, laptop $102_6$, a workstation $102_5$, etc.) that are configured to log into the cloud-based shared content storage system 101. A user can interact with one or more workspaces and, in a collaboration setting, multiple users can access the same document or object. A user can be associated with one or more role profiles (e.g., role profile $127_1$, role profile $127_2$, role profile $127_3$).

When two or more users access the same object, and more particularly when two or more users access the same object for editing access (e.g., READ/WRITE access), the possibility arises that the two users can make respective changes, which changes may be consistent with each other (e.g., when the respective edits are performed in different sections of the document), or the changes may be inconsistent with each other (e.g., as can arise when the respective edits are performed on the same elements of the document). Strictly as one example, and as shown, an editing action taken in a first editing session may "modify element M", while at the same time an editing action is taken by another user in a second editing session to "delete element M". The conflict arises since both editing actions cannot be accepted without conflict. That is, if the "delete element M" action is accepted then the intended modification of element M is lost.

On the other hand, if the "modify element M" is accepted, then the intended deletion of element M is lost. Such conflicts can occur whenever there are two or more users that are granted access to edit the same object. Using any technique, the occurrence of a conflict or potential conflict can be detected by any element of the shown cloud-based shared content storage system 101, and a conflict resolution protocol can be invoked so as to advise the users of the detected conflict or potential conflict and to engaged in a protocol with one or more of the users to resolve the conflict using any one or more of an adaptively-selected set of conflict resolution options. Thus the conflict can be remediated, and the conflict-free object can be stored for subsequent access.

Objects can be stored, possibly in many forms (e.g., a cached instance, a preview instance, a locked instance, a pre-remediated instance, a post-remediated instance, an in-remediation instance, etc.) and can be managed by any of a variety of processing elements and/or storage devices (e.g., a storage filer) and/or servers such as a host server 115, a sync server 120, a collaboration server 152, a cloud drive server 158, a notification server 156, etc.

Synchronization-related and conflict-related functions can be performed by any element of the shown cloud-based shared content storage system 101, and/or by the client side components on user devices 102, and/or by a sync client on a user device, and/or by a sync server 120, and/or by any other related components as described herein.

A set of collaborators 118 can be comprised of any types or roles of users. For example, and as shown, roles can include a user collaborator $123_0$, an administrator collaborator $124_0$, a creator collaborator $125_0$, etc. Collaborators can invoke uploads and/or downloads to/from a host farm and user devices. Collaborators can invoke workspaces based on roles or other settings, and workspaces can be configured in specific ways so as to facilitate concurrent editing of objects. In particular, workspaces can be configured to present conflict alerts to users who are engaged in concurrent editing of an object. Additional aspects of workspace configuration is given in the following figures.

Figure 1B:
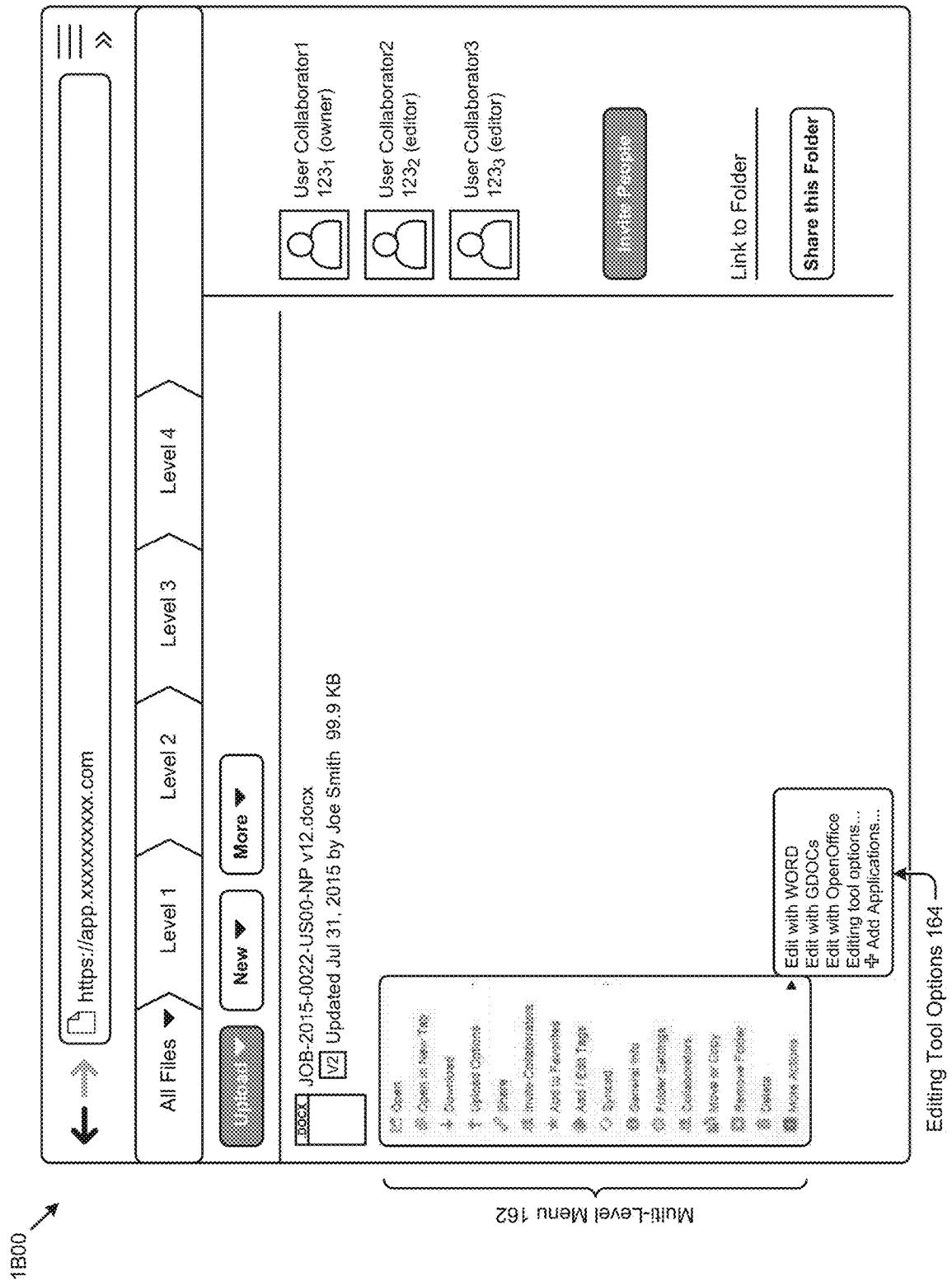
FIG. 1B depicts a workspace web page showing tools that can be used in concurrent object editing sessions.

FIG. 1B depicts a workspace web page 1B00 showing tools that can be used in concurrent object editing sessions. As an option, one or more variations of workspace web page 1B00 or any aspect thereof may be implemented in the context of the architecture and functionality of the embodiments described herein. Also, the workspace web page 1B00 or any aspect thereof may be implemented in any environment.

The shown workspace is depicted as a web page, however other embodiments are possible (e.g., via an app on a mobile device). In this embodiment, the workspace web page 1B00 is accessed over a secure protocol (e.g., see "https://"). A file is present at a particular hierarchical level, and an icon, possibly in juxtaposition with an object identifier, is presented in an object listing display area. A user interface operation such as a mouse click brings up a multi-level menu 162. One or another sub-menu from the multi-level menu presents a set of editing tool options 164. As shown, several tools that are capable of editing the shown object type (e.g., a ".docx" file) are presented, namely, "GDOCs", "WORD", and "OpenOffice"). The user selects the edit tool from the menu, and the object is opened with the selected tool. Such a selection of an edit tool by the user is tracked in a history log and/or a preferences file. A history log entry and/or preferences are used subsequently when adaptively or predictively selecting conflict resolution tools. More specifically, if the "WORD" edit tool was selected by the user during an edit session, then the user's preference for the REDLINE conflict resolution tool in "WORD" might be inferred.

As shown, the workspace web page includes a collaborator panel. Such a collaborator panel might include photos or avatars or other identification of others who have access privileges to share the object or folder. In this case, the selected ".DOCX" file is shared by user collaborator1 $123_1$, user collaborator2 $123_2$, and user collaborator3 $123_3$. Furthermore, respective roles are shown for each collaborator. All of the shown collaborators, namely, user collaborator1 $123_1$, user collaborator2 $123_2$, and user collaborator3 $123_3$ have edit privileges, and any of the collaborators can invoke respective edit sessions, any or all of which can run concurrently.

Figure 2:
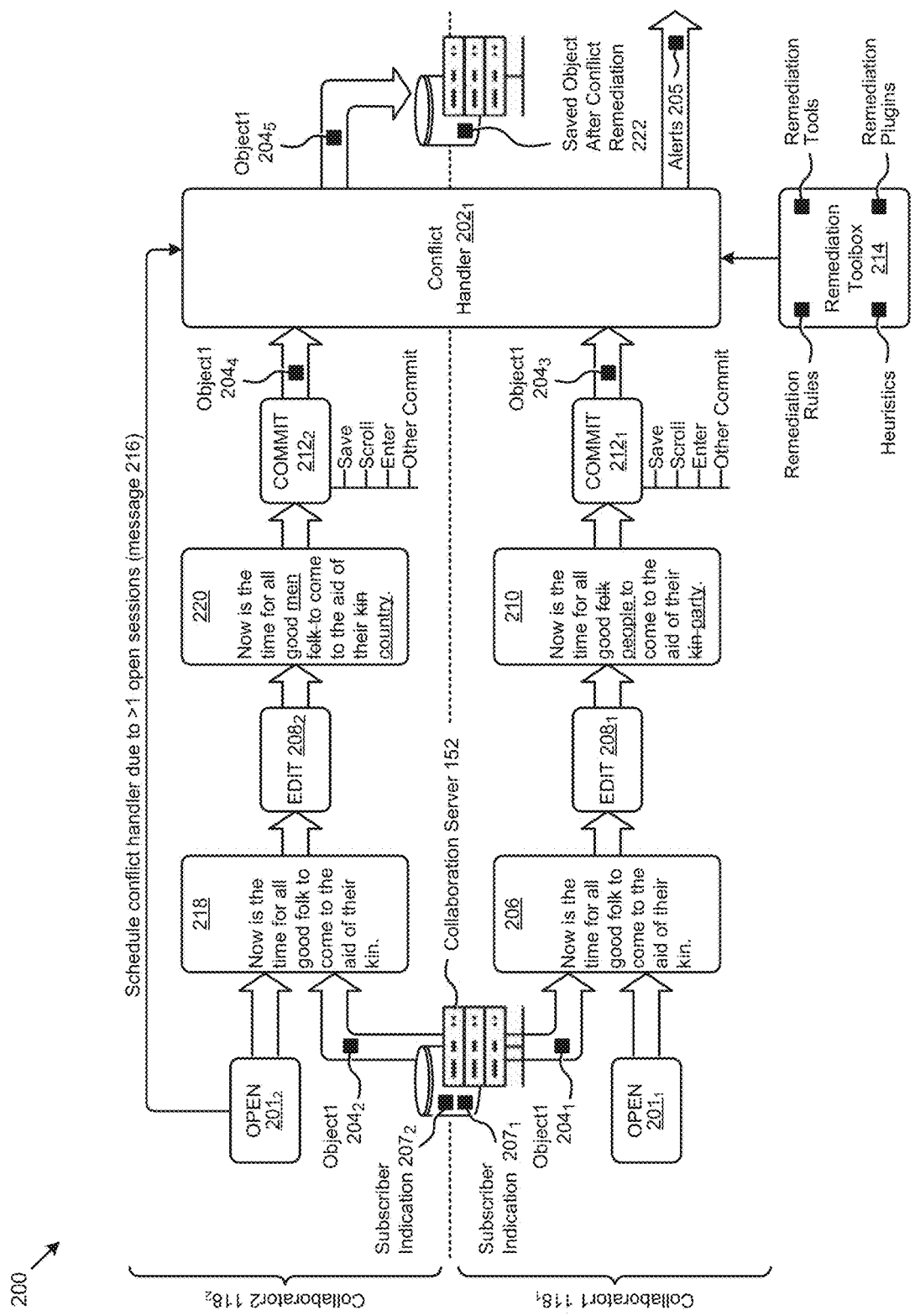
FIG. 2 is a flow diagram showing concurrent editing sessions that introduce object content conflicts to be remediated by conflict resolution tools.

FIG. 2 is a flow diagram 200 showing concurrent editing sessions that introduce object content conflicts to be remediated by conflict resolution tools. As an option, one or more variations of the shown flows or concurrent editing sessions or any aspect thereof may be implemented in the context of the architecture and functionality of the embodiments described herein. Also, the flows of the concurrent editing sessions or any aspect thereof may be implemented in any environment.

The flow proceeds time-wise from left to right. At the same moments in time, two editors (e.g., collaborator1 $118_1$ and collaborator2 $118_2$) submit commands to perform edit operations (e.g., see open operation $201_1$, and open operation $201_2$) on the same object (e.g., object)). The collaboration server 152 responds to the commands by contemporaneously delivering two instances of the requested object (e.g., object) $204_1$ and object) $204_2$), and recording a subscriber status to each subscribing collaborator (e.g., see subscriber indication $207_1$, subscriber indication $207_2$). Accessing a shared object so as to be granted one or more variations of subscriber status can also result in choices being presented to the subscribers. For example, one variation of subscribing offers the subscribing collaborator the option to receive notifications (e.g., via SMS or via email alerts). The occurrence and ongoing management of such notifications can be managed, at least in part, but the subscribing collaborator, and notification management parameters can be store in a collaborator's role profile records.

Prior to delivering the second editable copy of the object to the requestor, a message is posted to schedule a conflict handler operation due to the second open session (see message 216). The two editors perform edits to their respective instances of object1 in their respective workspaces. In the collaborator1 workspace rendering 206, the object is rendered, in this example, showing the text "Now is the time for all good folk to come to the aid of their kin." At the same time, in the collaborator2 workspace rendering 218, the object is rendered, in this example, showing the text "Now is the time for all good folk to come to the aid of their kin."

While both editor's workspaces are open, collaborator1 performs edit operation $208_1$, and collaborator2 performs edit operation $208_2$. The particular edits performed are different. In this example, the particular edits made are not only detectable (e.g., see commit operation $212_1$ and commit operation $212_2$), they are also deemed to be in conflict. Specifically, and as is detected by the conflict handler $202_1$ (e.g., upon the event of a commit), the collaborator2 text 220 shows "Now is the time for all good men to come to the air of their country." and the collaborator1 text 210 shows "Now is the time for all good people to come to the aid of their party." as being subject to conflict remediation. A commit operation can be a save operation, or a commit operation can be in the form of typing a return or a newline character, or can be terminating an editing command (e.g., add a row or column to a table), or can be a navigating event or scrolling away from the edited portion, or can be from an auto-save operation, or can be responsive to an expiration of an editing or session timeout period. As shown, multiple commit operations performed by multiple respective users can result in respective new instances of the concurrently-edited object (e.g., see object1 204$_3$ and object1 204$_4$), which in turn can be sent to a conflict handler. In some cases, the existence of one or more new instances of the concurrently-edited object are detected when one or more of the collaborators saves the file.

The conflict handler 202$_1$ draws from a remediation toolbox 214 so as to retrieve remediation rules, remediation heuristics, remediation tools, and remediation add-ins. After applying remediation steps (e.g., using remediation rules, remediation heuristics, or other steps), the conflict might be deemed to have been reconciled, and an updated copy of the remediated object (see object1 204$_5$) is sent to the collaboration server and saved (e.g., see saved object after conflict remediation 222). In some cases, and as discussed infra, remediation steps include interaction with one or more collaborators. In some cases, remediation is handled automatically (e.g., without further interaction with the collaborators). In some cases, and as discussed below, steps in combination with user interactions are undertaken in a user engagement protocol. In some situations, a set of conditions can be detected such that remediation can be performed without user action. However, when conditions are detected such that user remediation is warranted (e.g., entering a state where user-aided remediation is to be conducted), then one or more alerts 205 are sent to the collaborators.

Figure 3A:
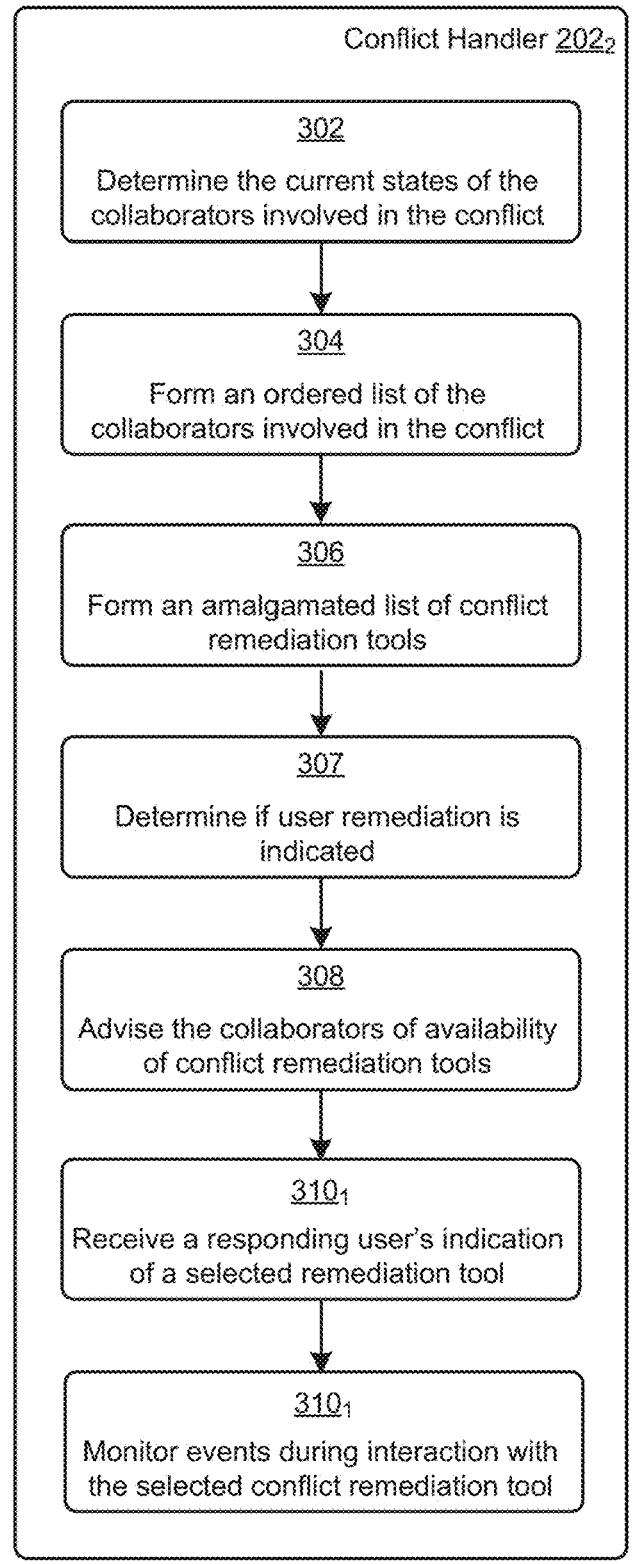
FIG. 3A and FIG. 3B depict a step-oriented implementations of a conflict handler used in systems that recommend conflict resolution tools for conflict remediation, according to an embodiment.

FIG. 3A depicts a step-oriented implementation 3A00 of a conflict handler 202$_2$ used in systems that recommend conflict resolution tools for conflict remediation. As an option, one or more variations of a step-oriented implementation 3A00 or any aspect thereof may be implemented in the context of the architecture and functionality of the embodiments described herein. Also, the step-oriented implementation 3A00 or any aspect thereof may be implemented in any environment.

The shown conflict handler 202$_2$ commences based on a previously-determined state that user-aided remediation is to be conducted. The shown conflict handler 202$_2$ can be implemented in any computing element within the cloud-based environment, and can have access to any information in that environment. Strictly as one example, a conflict handler 202$_2$ can be implemented within collaboration server 152.

Step 302 begins the remediation by accessing role profiles (e.g., role profile 127$_1$, role profile 127$_2$, role profile 127$_3$) to determine the status of collaborators (e.g., users or other actors) involved in the conflict, and processing moves to step 304 where the users or actors involved in the conflict are organized into a list. Given the list of collaborators involved in the conflict, an amalgamation of potential conflict resolution tools is assembled (see step 306) and the collaborators involved in the conflict are advised (see step 308). In some cases one of several collaborators involved in the conflict might be offline, so notification might be delayed, or dismissed. At some point in time, one of the collaborators involved in the conflict responds to a conflict alert (e.g., see alerts 205 of FIG. 2) and takes action from a workspace user interface (see FIG. 4).

In some cases, although there might be one or more collaborators involved in concurrent accesses, it might happen that even though the concurrent accesses introduce the potential for conflicts, there is no conflict in fact, so notification need not be sent to the collaborators (see step 307). Such a scenario can happen when multiple users access for READ/WRITE, and yet only one or none of the multiple users perform a commit operation that introduces an actual conflict. Conflicts of these types do not need to invoke user remediation. For example, a regime for automatic remediation can include a rule such as "last commit wins". It is also possible that a regime for automatic remediation can include a rule such as "first commit wins", and such a rule is applied when later commits are deemed to be invalid (e.g., a commit occurs after a broken network link has been restored). There are also situations where two or more users make the same edits. The presentation of multiple instances of edited objects can be checked to determine if the edits are consistent. For example, one user can edit a top portion of an instance of a document, and another user can edit a bottom portion of a different instance of a same document, and when there is no overlap between the top portion and the bottom portion, it can be deemed that there is no conflict and, accordingly, there is no need to advise the users of the availability of conflict resolution tools. Many other cases exist however, where user remediation is indicated.

As shown, step 308 serves to advise the responding user of the availability of conflict resolution tools. The responding user selects a remediation tool (e.g., see step 310$_1$). The user's selection is delivered to the server or servers handling the workspace, and an instance of the selected remediation tool is invoked for the remediating user. In some cases, a copy of the object to be remediated is provided to the invoked instance of the selected remediation tool. Moreover, in some cases, a copy of the object to be remediated is provided to the invoked instance of the selected remediation tool together with an index, or location of a start location, or an index or location of a conflict (e.g., a conflict location indication) such that the user can see the area or areas in need of user remediation. As the user interacts with the remediation tool, events are monitored (e.g., see step 312). A workspace monitor can detect when the user has performed a remediation, and can take next steps, possibly to store the remediated document, and cancel or dismiss other pending events pertaining to remediation of the particular conflict.

Figure 3B:
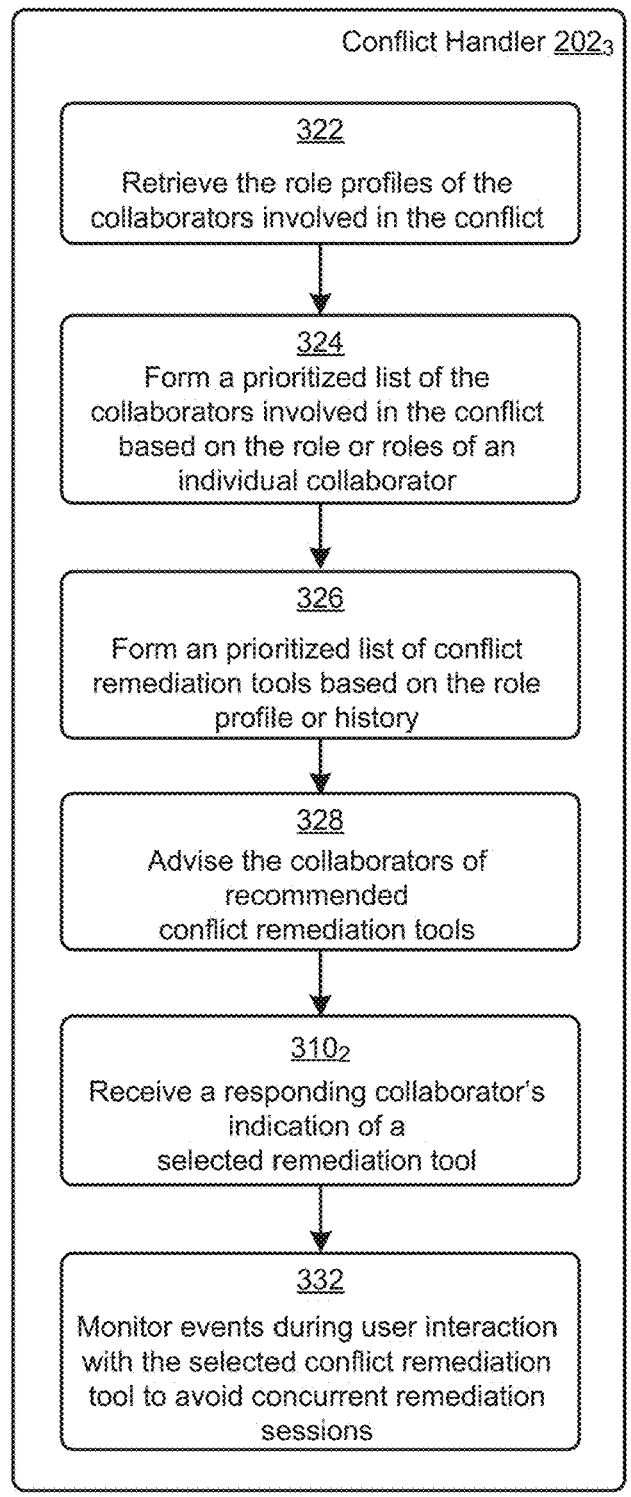

FIG. 3B depicts a step-oriented implementation 3B00 of a conflict handler 202$_3$ used in systems that recommend conflict resolution tools for conflict remediation. As an option, one or more variations of a step-oriented implementation 3B00 or any aspect thereof may be implemented in the context of the architecture and functionality of the embodiments described herein. Also, the step-oriented implementation 3B00 or any aspect thereof may be implemented in any environment.

Step 322 begins the remediation by accessing role profiles (e.g., role profile 127$_1$, role profile 127$_2$, role profile 127$_3$) to determine the status of collaborators involved in the conflict, and processing moves to step 324 where the collaborators involved in the conflict are organized into a prioritized list of a particular order. Strictly as one example, a particular order might place the collaborator with a role of "administrator collaborator" ahead of a "creator collaborator", and might place the collaborator with a role of "creator collaborator" ahead of a "user collaborator". Given the list of collaborators involved in the conflict, an amalgamation of potential conflict resolution tools is assembled (see step 326) and the collaborators involved in the conflict are notified (see step 328).

Based on the collaborators involved in the conflict, and based on their respective states or roles, recommendations are formed. Collaborators are advised of recommended remediation tools. One of a set of responding collaborators selects a remediation tool from the recommended ones. The collaborator's selection of a recommended remediation tool is delivered to the server or servers handling the workspace (see step $310_2$), and an instance of the selected remediation tool is invoked for the remediating collaborator. As the collaborator interacts with the remediation tool, events are monitored (e.g., see step 332). A workspace monitor can detect when the collaborator has performed a remediation, and can take next steps, possibly to store the remediated document, and/or to cancel or dismiss other pending events pertaining to remediation of the particular conflict. The monitoring processes of step 332 further serves to prevent the invocation of multiple remediation sessions.

The aforementioned selection of a remediation tool (e.g., see step $310_1$ or step $310_2$) and/or presentation of recommendations (e.g., see step 328) can be implemented as a set of menu options.

FIG. 4A1 depicts a presentation of a set of menu options 4A100 pertaining to text-oriented conflict resolution tools used in collaborator-directed conflict remediation. As an option, one or more variations of menu options 4A100 or any aspect thereof may be implemented in the context of the architecture and functionality of the embodiments described herein. Also, the menu options 4A100 or any aspect thereof may be implemented in any environment.

To facilitate the resolution of conflicts, various tool might be used. For example, a text or other document editor might have a built-in or add-in available that identifies changes (e.g., REDLINE changes) between two passages of text. A given conflict remediation tool might rely on an interview style user interface where specific passages-in-conflict are presented to the user, and the user is interviewed so as to choose one of the presented passages-in-conflict. Some examples of conflicted elements and remediation through a conflict handler are given in FIG. 5A and FIG. 5B.

One possibility for a conflict resolution tool is to use the tool as was used to generate the document or object being remediated. For example, if the remediating user used the WORD tool to edit the document that is now the subject of a remediation session, then it might be that the user would want to use the built-in or add-in available in the WORD tool. In some situations, one user might have used WORD in an editing session (e.g., see first editing session $121_1$), and another user in another editing session (e.g., see second editing session $121_2$) might have used the GDOCs editor. In such a situation the availability of the GDOCs tool to resolve conflicts might be presented in a dynamically-constructed conflict resolution tools selection menu $410_1$.

The procedure for forming such a dynamically-constructed conflict resolution tools selection menu $410_1$ can include any of the aforementioned operations of conflict handler $202_2$ or conflict handler $202_3$. In particular, a user's history log and/or a preferences setting indicates a usage and/or preference for WORD, then that option might be presented as a first tool option menu item $412_1$. If the user's history log and/or a preferences setting indicates a lesser usage and/or lesser preference for GDOCs, then that option might be presented as a second tool option menu item $414_1$.

Other possibilities for the ordering and content of a dynamically-constructed conflict resolution tools selection menu can include consideration of various forms of analysis, remediation rule application, heuristics, as well the availability of applicable remediation tools and/or availability of applicable remediation tool add-ins. As such, the ordering and content of a dynamically-constructed conflict resolution tools selection menu can change from user to user.

FIG. 4A2 depicts a workspace showing a presentation of a user-specific set of menu options 4A200 pertaining to text-oriented conflict resolution tools used in user-directed conflict remediation. As an option, one or more variations of menu options 4A200 or any aspect thereof may be implemented in the context of the architecture and functionality of the embodiments described herein. Also, the menu options 4A200 or any aspect thereof may be implemented in any environment.

As heretofore indicated, the procedure for forming such a dynamically-constructed conflict resolution tools selection menu $410_1$ can include a particular user's history log and/or a preferences. If the user's history log and/or preference settings indicates a lesser usage and/or lesser preference for GDOCs, then that option might be presented as a first tool option menu item $412_2$ with other options presented in other instances of tool menu options (e.g., first tool option menu item $412_2$). The order or presentation of tool options can vary depending on user characteristics. In particular, if a user's history log and/or preferences indicates a usage and/or preference for GDOCs, then that option might be presented as a first tool option menu item $412_2$. If the user's history log and/or preferences indicates a lesser usage and/or lesser preference for WORD, then that option might be presented as a second tool option menu item $414_2$. Strictly as one embodiment, a dynamically-constructed conflict resolution tools selection menu $410_1$ can be constructed based on a user, or a user's history, or a user's role profile record, or any other data pertaining to a particular user.

Further, a dynamically-constructed conflict resolution tools selection menu can be based on the particular shared object being considered. For example, the shared object being considered might be an image over which (for example) multiple image processing operations are applied to particular portions of the image. Or, as another example, the shared object being considered might be a table or a spreadsheet over which (for example) processing operations are applied over particular lines rows, columns or cells. A different set of conflict resolution tools and/or options might apply to the object type of the shared object.

FIG. 4A3 depicts a remediation tool showing an in-application presentation of a user-specific set of menu options pertaining to text-oriented conflict resolution tools used in user-directed conflict remediation, according to an embodiment. As shown, user-specific set of menu options pertaining to text-oriented conflict resolution tools can be presented in a separate window, or a set of menu options pertaining to text-oriented conflict resolution tools can be presented in the form of a modal.

Figure 4B:
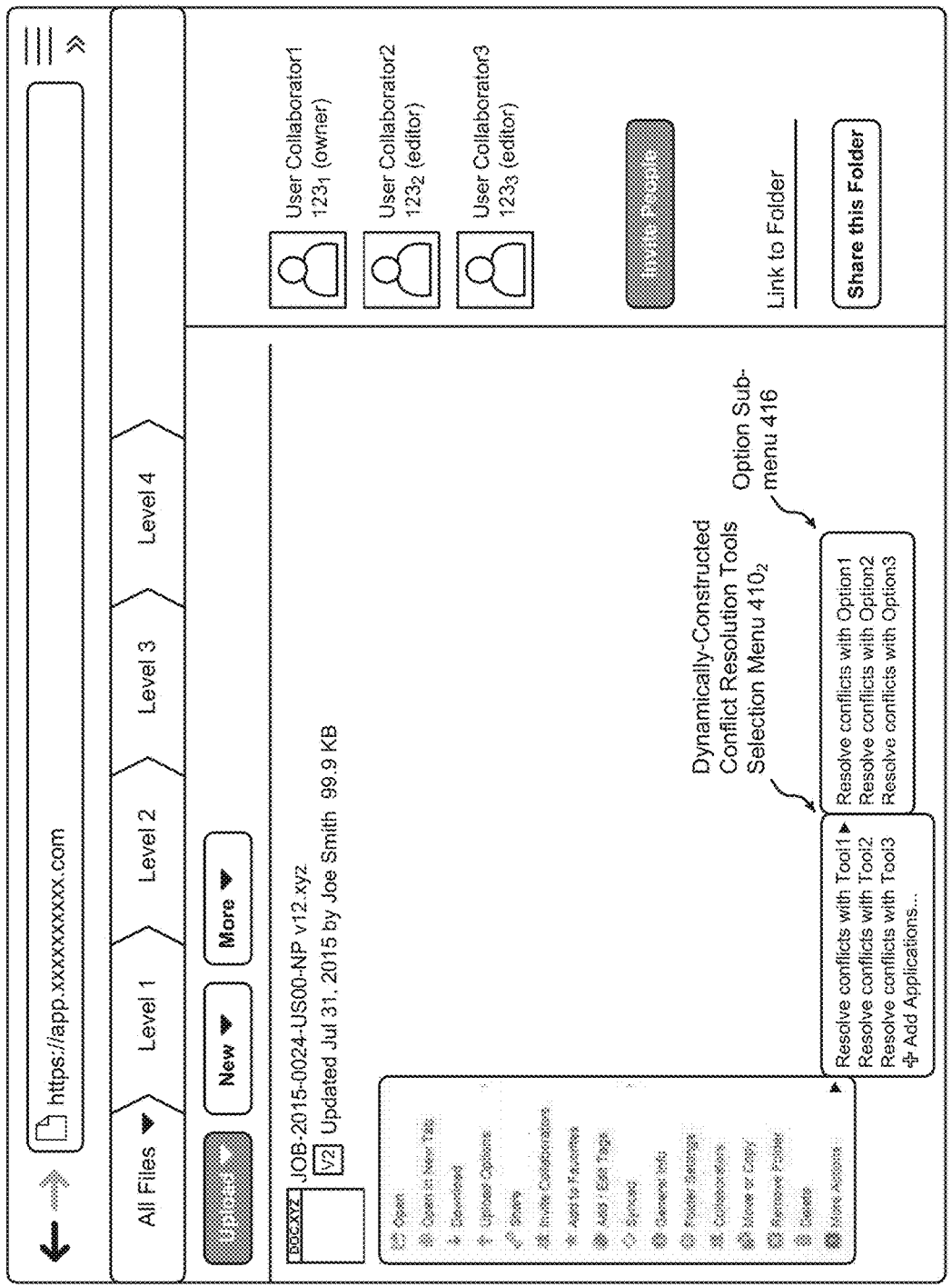
FIG. 4B depicts a set of menu options pertaining to shared object conflict resolution tools used in user-directed conflict remediation, according to an embodiment.

FIG. 4B depicts a set of menu options 4B00 pertaining to shared object conflict resolution tools used in user-directed conflict remediation. As an option, one or more variations of menu options 4B00 or any aspect thereof may be implemented in the context of the architecture and functionality of the embodiments described herein. Also, the menu options 4B00 or any aspect thereof may be implemented in any environment.

As shown, the user is presented with a dynamically-constructed conflict resolution tools selection menu $410_2$.

Further, in this particular embodiment, the dynamically-constructed conflict resolution tools selection menu $410_2$ includes an option submenu 416. An option submenu is constructed based on the tools listed in the then-current instance of the dynamically-constructed conflict resolution tools selection menu. In this example, the dynamically-constructed conflict resolution tools selection menu includes "Tool1", "Tool2", and "Tool3", and the option submenu includes options pertaining to a selection of "Tool1", namely the option submenu includes "Option1", "Option2", and "Option3".

FIG. 5A and FIG. 5B present user interactions with a recommended conflict resolution tool that was selected to remediate conflicting text elements.

In session 5A00, collaborator1 $118_1$ interacts with a conflict handler $202_4$ to perform conflict remediation by selecting one or two presented conflicted elements $506_1$. More specifically, the user selects from an "A" possibility or a "B" possibility using an option selection interface. In the example of session 5A00, the collaborator considers conflicted item 502 ("A") and conflicted item 504 ("B") and then selects "A", which results in a conflict resolution in the form of conflict-resolved item $508_1$.

In session 5B00, collaborator1 $118_1$ interacts with a conflict handler $202_4$ to perform conflict remediation by selecting one or two presented conflicted elements $506_2$. In the example of session 5B00, the collaborator considers conflicted item 510 ("A") and conflicted item 512 ("B") and then selects "B", which results in a conflict resolution in the form of conflict-resolved item $508_2$.

Any of the aforementioned embodiments of conflict handlers can be implemented in whole or in part within the cloud-based shared content storage system 101 (e.g., see server-side conflict detection and remediation of FIG. 1A), or any of the aforementioned embodiments of conflict handlers can be implemented in whole or in part within any one or more of the user devices 102 (e.g., see client-side conflict detection and remediation of FIG. 1A). Moreover, the aforementioned techniques pertaining to subscribing to an object (e.g., see subscriber indication $207_1$, subscriber indication $207_2$) can be used as a means to coordinate user actions among multiple users. The subscription techniques have the performance benefits of not requiring each client to communicate to each other. Rather, each client registers with the server, and various user actions taken using the client instance are detected and managed by the server. Strictly as one example, a client session might receive a server-emitted warning or might receive a server-emitted error message if the client attempts to subscribe to a second instance of the same object.

Figure 6:
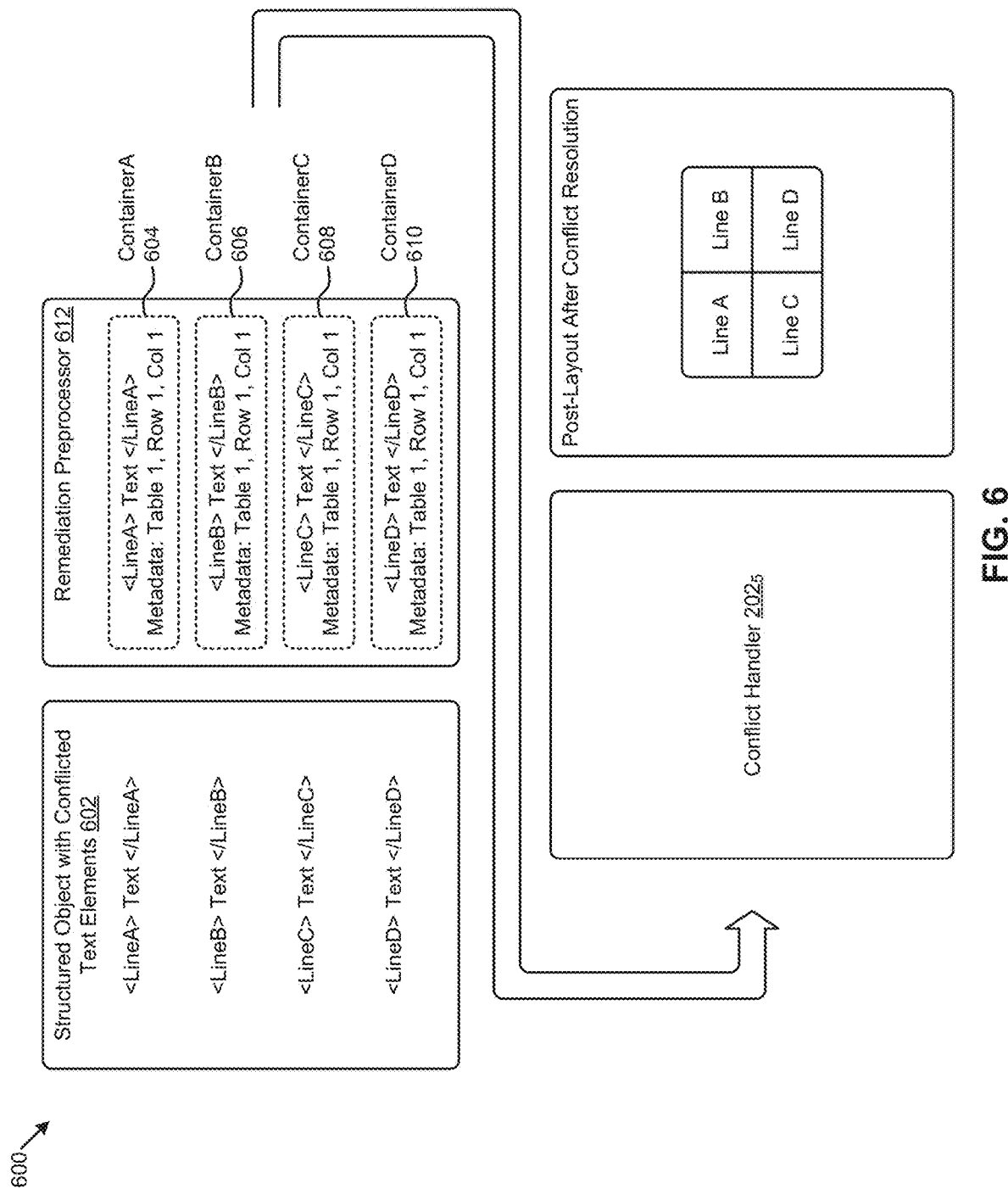
FIG. 6 presents a technique for metadata tagging used by a recommended conflict resolution tool that was selected to remediate conflicting elements found between two instances of a shared structured object, according to an embodiment.

FIG. 6 presents a technique for metadata tagging 600 used by a recommended conflict resolution tool that was selected to remediate conflicting elements found between two instances of a shared structured object. As an option, one or more variations of metadata tagging 600 or any aspect thereof may be implemented in the context of the architecture and functionality of the embodiments described herein. Also, the metadata tagging 600 or any aspect thereof may be implemented in any environment.

The embodiment shown in FIG. 6 depicts an example of a shared structured with a set of conflicting elements (e.g., structured object with conflicted text elements 602). The conflict handler $202_5$ detects conflict occurrences and constituent elements, and a set of conflicting elements is pre-processed (e.g., see remediation preprocessor 612) so as to prepare the conflicting elements for input. The remediation preprocessor tags individual elements from the set of conflicting elements using metadata tags. For example, an individual element from the set of conflicting elements might correspond to an individually resolvable element, and can be handled as a unit in a particular type of container (e.g., containerA 604, containerB 606, containerC 608, containerD 610). A container can be labeled or tagged with metadata. Such metadata can inform downstream tools of the nature of the container, and can further inform downstream tools of characteristics of the items within the container. In this example, the containers represent the text of cells in a table or spreadsheet, and the characteristics of the items within the container correspond to (1) identification of the table, (2) identification of the row, and (3) identification of the column.

A shared structured that has been tagged can be provided to an instance of a conflict handler (e.g., conflict handler $202_5$) and, using any collaborator-selected tool and/or any collaborator-selected tool option, the conflict can be resolved. FIG. 6 depicts the structured object1 in a post-layout form after conflict resolution.

Further details regarding general approaches to handling structured objects are described in U.S. Provisional Application Ser. No. 62/109,019, titled "METHOD AND SYSTEM FOR IMPLEMENTING A COLLABORATION PLATFORM FOR STRUCTURED OBJECTS IN A DOCUMENT", filed on Jan. 28, 2015, which is hereby incorporated by reference in its entirety.

Figure 7A:
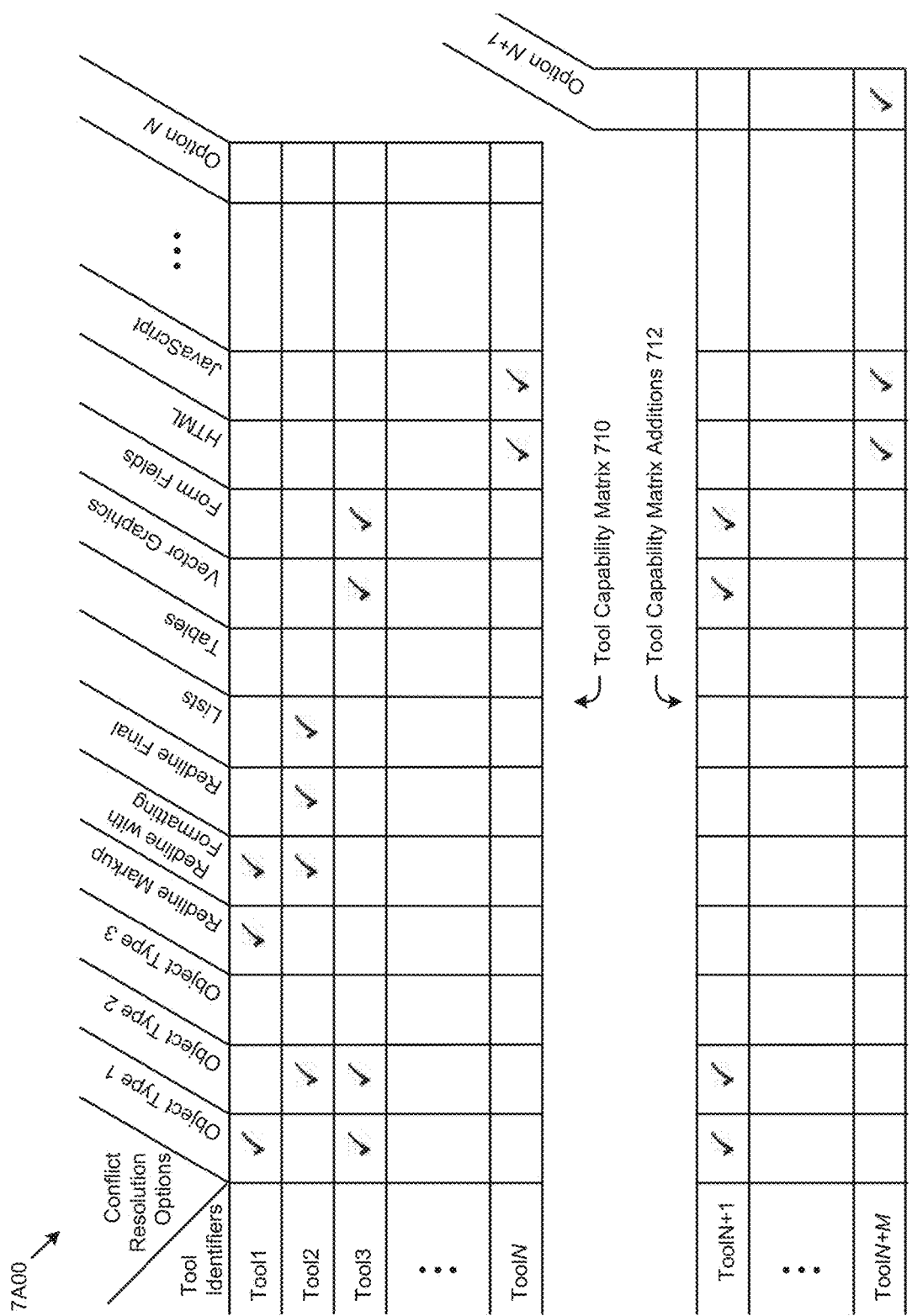
FIG. 7A and FIG. 7B depict alternative techniques for generation of a tool capability matrix used by systems that recommend conflict resolution tools for use in shared-object conflict remediation, according to some embodiments.
Figure 7B:
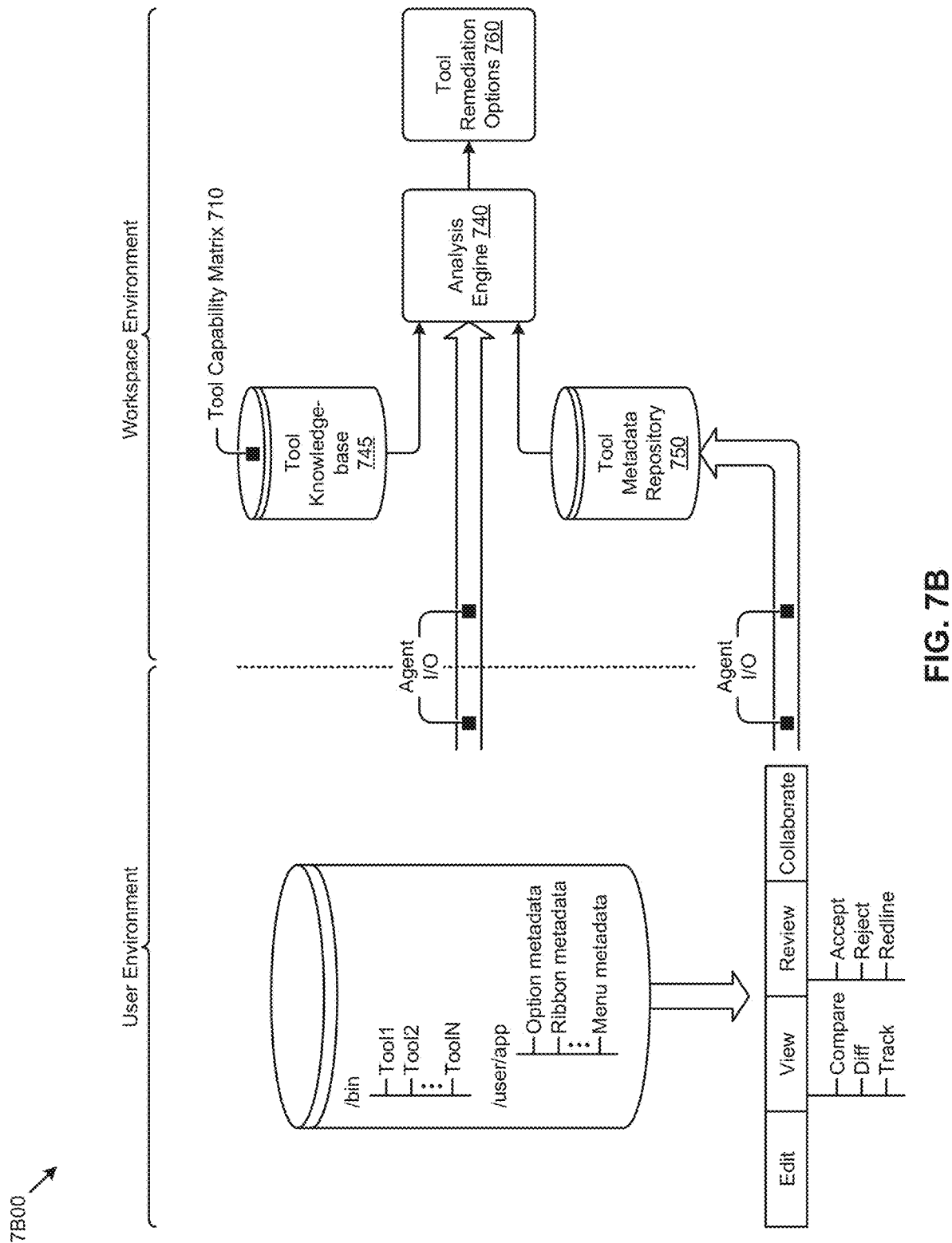

FIG. 7A and FIG. 7B depict alternative techniques for generation of a tool capability matrix used by systems that recommend conflict resolution tools for use in shared-object conflict remediation. More particularly, FIG. 7A depicts development of a tool capability matrix using a priori knowledge, possibly including adding more tools and/or capabilities (e.g., see tool capability matrix additions 712). FIG. 7B depicts development of a tool capability matrix and tool remediation options that are determined using information from the user's environment, possibly in combination with a knowledge base.

FIG. 7A depicts generation of a tool capability matrix 710 using a priori captured knowledge. As an option, one or more variations of tool capability matrix 710 or any aspect thereof may be implemented in the context of the architecture and functionality of the embodiments described herein. Also, the tool capability matrix 710 or any aspect thereof may be implemented in any environment.

The tool capability matrix can be used in techniques that select a tool or a tool option based on events or conditions pertaining to a collaborator and/or the collaborator's environment or history. As shown, the matrix includes a set of tools (see the leftmost column showing tool identifiers), and each tool of the set of tools is associated with a set of native remediation capabilities (e.g., conflict resolution options, a tool option, a tool add-in, etc.). Strictly as one example, the tool identified as "Tool1" can be used with objects of type "ObjectType1", as well as the built-in (e.g., native) tool conflict resolution options of "Redline Markup" and "Redline with Formatting". The tool capability matrix can be used in processing that determines a set of remediation tool options to address a range of actual or potential modification conflicts. In some cases, the remediation tool options comprise remediation tool options that are natively-supported within the subject editing tool. In other situations the remediation tool options comprise tool options that are enabled by plugins or scripts that interface through natively-supported application programming interfaces and/or I/O ports provided by the subject editing tool.

As shown, the tools and tool options are not limited to office-type documents (e.g., word documents, spreadsheets, presentations, etc.). Specifically, and as shown, the aforementioned techniques that recommend conflict resolution tools for use in shared-object conflict remediation can be applied to any type of object. The shown "ToolN" exemplifies a tool and tool options that might be used when the shared object is HTML code or JavaScript code. In such a case, the "ToolN" might refer to an integrated development environment (IDE) tool.

In various embodiments, an operational element (e.g., conflict handler 2020 accesses the contents of a remediation toolbox to identify remediation tools, remediation rules, remediation plugins, etc. Strictly as one example, a remediation plugin might pertain to a particular object type (e.g., a .DOC file, or an .XLS file) or a particular tool (e.g., WORD, EXCEL, etc.), or might pertain to a particular type of conflict, or might pertain to a particular type of resolution. As an example of use of a plugin that pertains to a particular type of resolution or remediation capability, a conflict handler can select a "Redline Markup" remediation capability and/or a "Redline with Formatting" remediation capability and/or a "Redline Final" remediation capability. When there are multiple remediation capabilities possible, a list of possible remediation capabilities can be presented to the user so the user can indicate a preference. Such a presentation, including a preference indication might be listed in an order that is derived from the user's history.

In addition to the aforementioned uses of the tool capability matrix (e.g., a pre-populated tool capability matrix), the user's device can, in some cases, be scanned for tool availability, and modification to the tool capability matrix can be made dynamically, for example, based on the user's execution environment and/or the particular type of object, conflict, or remediation. Possible techniques for generation of a tool capability matrix used by systems that recommend conflict resolution tools for use in shared-object conflict remediation are given in FIG. 7B.

FIG. 7B depicts development of a set of tool remediation options using information from the user's environment. Strictly as one example, a scan of the user's environment for tool availability and/or tool capabilities can include detection of plugins for dealing with lists, tables, spreadsheets, vector graphics, forms, web pages, code, etc.

As shown, the user's environment includes persistent storage, which in turn comprises a location for persistent storage of a tool binary (e.g., see "/bin"). A user directory can include application configuration data (e.g., see "/app") that stores native (e.g., built-in) features of a tool (e.g., option metadata, ribbon metadata, menu metadata, etc.). Strictly as one example, ribbon and/or menu metadata can include a set of commands (e.g., "Edit", "View", "Review", "Collaborate) which in turn might include sub-menu items (e.g., "Compare", "Diff", "Track", "Accept", "Reject", "Redline", etc.). Such aspects of a user's environment, specifically capabilities of a tool (e.g., features, and/or commands, and/or menu items, and/or sub-menu items, etc.) can be used to when determining which tool capability is available for remediation in the case of found differences between two objects.

In some embodiments, an agent (e.g., code other than a browser) is installed in the user's environment, and such an agent can scan the user's environment to determine capabilities of a tool. The agent-identified data can be used as inputs to an analysis engine 740 that takes in other inputs (e.g., a tool knowledge base 745 and/or portions of a tool metadata repository 750) and produces a set of tool remediation options 760. Any aspects of the produced set of tool remediation options can be stored fed back into the tool knowledge base, and/or fed back into the tool metadata repository. As one example, when the shown analysis engine 740 determines a particular tool remediation option, and that option is confirmed by a user, then aspects of that particular tool remediation option and the nature of the option confirmation can be stored in the tool knowledge base, and/or in the tool metadata repository.

Automatic detection of differences, and recommendation of one or more tool-specific remediation options can be performed over multiple versions of an object (e.g., which multiple versions might have one or more potential modification conflicts.

Strictly as one example, embodiments that implement automatic detection of differences (e.g., whether in conflict or not) can operate over a set of versions of the stored object. For example, a user might be presented with a table or listing that indicates differences found between "version V1" and "version V2", and/or between "version V2" and "version V3", and/or between "version V1" and "version V3", etc. In situations where multiple versions of an object were saved at different times by multiple users, a table or listing depicting a chain of events can presented to a user or users. Furthermore any one or more of the determined tool remediation options can be presented to a user.

Real-Time Conflict Determination and Recommendation of Remediation Options

The foregoing remediation techniques can be performed over instances that are undergoing real-time concurrent editing. For example, two users might access the same document from a G-Docs or other document repository, and perform real-time concurrent editing that could result in a need for user remediation. Various forms of intra-document user remediation can be performed to generate an updated (e.g., remediated) version. Any version control provided by the document repository can be performed on the resulting updated (e.g., remediated) version of the shared document.

ADDITIONAL EMBODIMENTS OF THE DISCLOSURE

Additional Practical Application Examples

Figure 8:
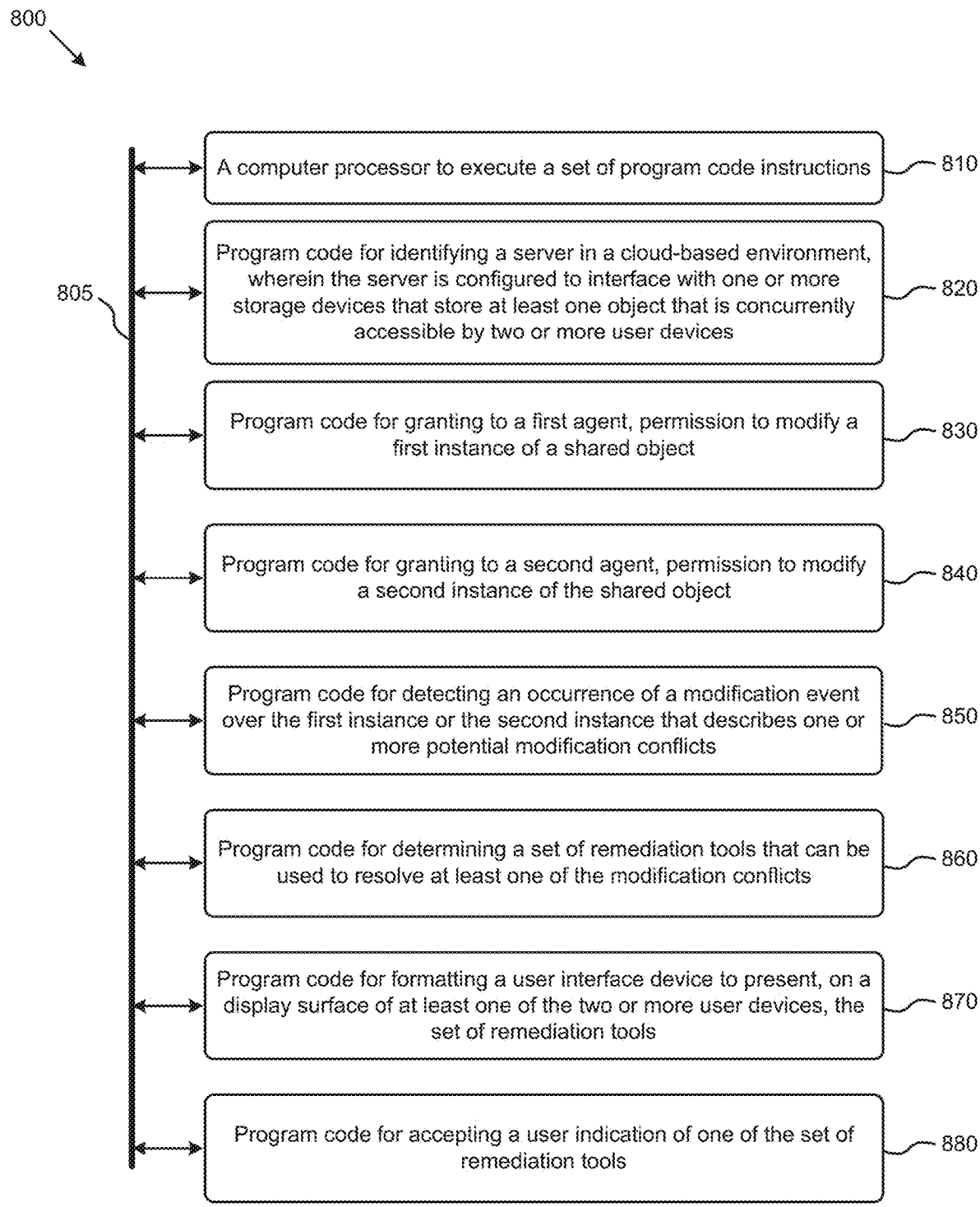
FIG. 8 depicts system components as arrangements of computing modules that are interconnected so as to implement certain of the herein-disclosed embodiments.

FIG. 8 depicts a system 800 as an arrangement of computing modules that are interconnected so as to operate cooperatively to implement certain of the herein-disclosed embodiments. The partitioning of system 800 is merely illustrative and other partitions are possible. As an option, the system 800 may be implemented in the context of the architecture and functionality of the embodiments described herein. Of course, however, the system 800 or any operation therein may be carried out in any desired environment.

The system 800 comprises at least one processor and at least one memory, the memory serving to store program instructions corresponding to the operations of the system. As shown, an operation can be implemented in whole or in part using program instructions accessible by a module. The modules are connected to a communication path 805, and any operation can communicate with other operations over communication path 805. The modules of the system can, individually or in combination, perform method operations within system 800. Any operations performed within system 800 may be performed in any order unless as may be specified in the claims.

The shown embodiment implements a portion of a computer system, presented as system 800, comprising a computer processor to execute a set of program code instructions (see module 810) and modules for accessing memory to hold program code instructions to perform: identifying a server in a cloud-based environment, wherein the server is configured to interface with one or more storage devices that store at least one object that is concurrently accessible by two or more user devices (see module 820); granting to a first agent, permission to modify a first instance of a shared object (see module 830); granting to a second agent, permission to modify a second instance of a shared object (see module 840); detecting an occurrence of a modification event over the first instance or the second instance that describes one or more potential modification conflicts (see module 850); determining a set of remediation tools that can be used to resolve at least one of the modification conflicts (see module 860); formatting a user interface device to present the set of remediation tools on a display surface of at least one of the two or more user devices (see module 870); and accepting a user selection of one of the set of remediation tools (see module 880).

SYSTEM ARCHITECTURE OVERVIEW

Additional System Architecture Examples

Figure 9A:
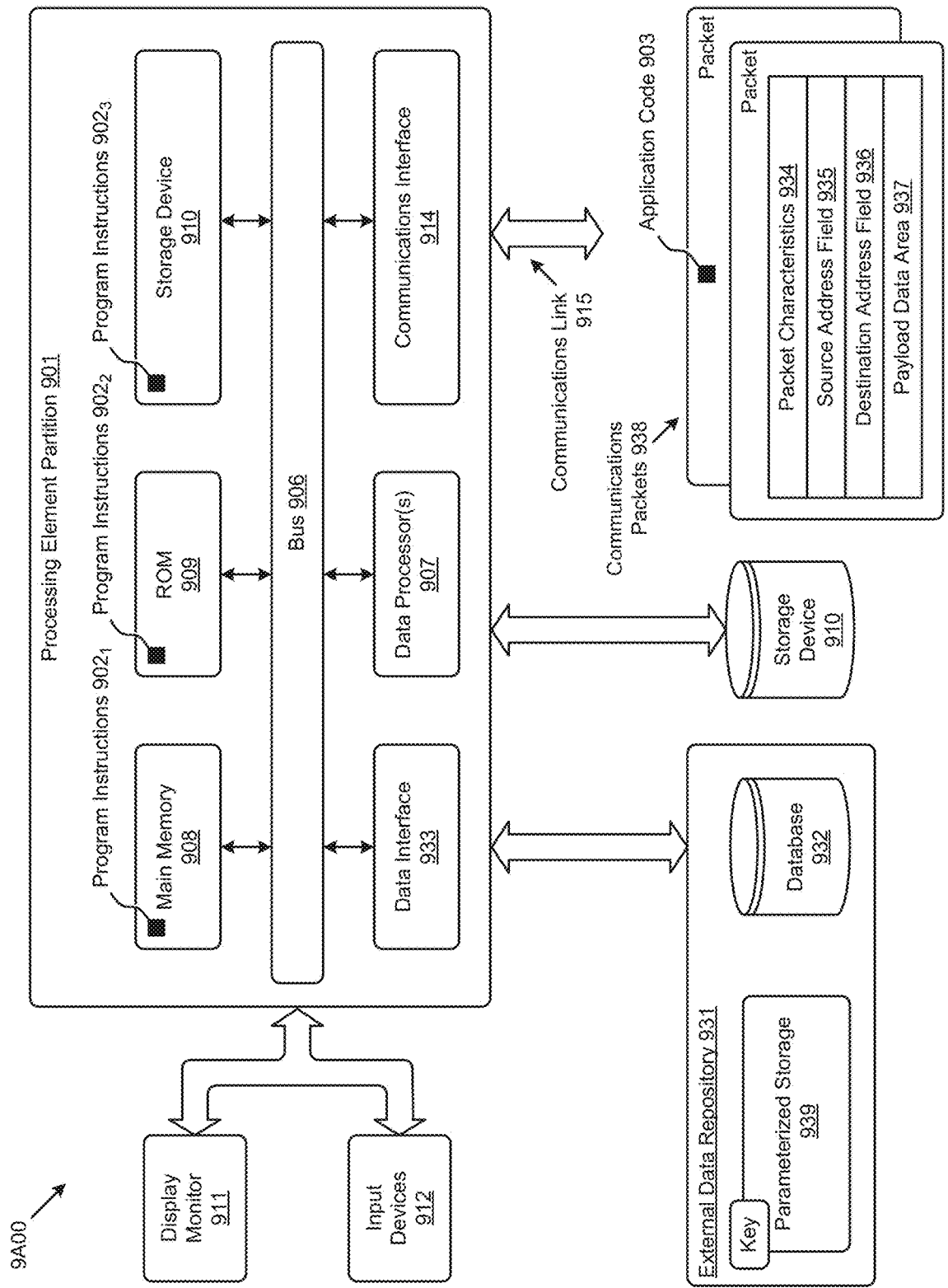
FIG. 9A and FIG. 9B depict exemplary architectures of components suitable for implementing embodiments of the present disclosure, and/or for use in the herein-described environments.

FIG. 9A depicts a block diagram of an instance of a computer system 9A00 suitable for implementing embodiments of the present disclosure. Computer system 9A00 includes a bus 906 or other communication mechanism for communicating information. The bus interconnects subsystems and devices such as a central processing unit (CPU), or a multi-core CPU (e.g., data processor 907), a system memory (e.g., main memory 908, or an area of random access memory (RAM)), a non-volatile storage device or non-volatile storage area (e.g., read-only memory 909), an internal or external storage device 910 (e.g., magnetic or optical), a data interface 933, a communications interface 914 (e.g., PHY, MAC, Ethernet interface, modem, etc.). The aforementioned components are shown within processing element partition 901, however other partitions are possible. The shown computer system 9A00 further comprises a display 911 (e.g., CRT or LCD), various input devices 912 (e.g., keyboard, cursor control), and an external data repository 931.

According to an embodiment of the disclosure, computer system 9A00 performs specific operations by data processor 907 executing one or more sequences of one or more program code instructions contained in a memory. Such instructions (e.g., program instructions $902_1$, program instructions $902_2$, program instructions $902_3$, etc.) can be contained in or can be read into a storage location or memory from any computer readable/usable medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 9A00 performs specific networking operations using one or more instances of communications interface 914. Instances of the communications interface 914 may comprise one or more networking ports that are configurable (e.g., pertaining to speed, protocol, physical layer characteristics, media access characteristics, etc.) and any particular instance of the communications interface 914 or port thereto can be configured differently from any other particular instance. Portions of a communication protocol can be carried out in whole or in part by any instance of the communications interface 914, and data (e.g., packets, data structures, bit fields, etc.) can be positioned in storage locations within communications interface 914, or within system memory, and such data can be accessed (e.g., using random access addressing, or using direct memory access DMA, etc.) by devices such as data processor 907.

The communications link 915 can be configured to transmit (e.g., send, receive, signal, etc.) any types of communications packets 938 comprising any organization of data items. The data items can comprise a payload data area 937, a destination address 936 (e.g., a destination IP address), a source address 935 (e.g., a source IP address), and can include various encodings or formatting of bit fields to populate the shown packet characteristics 934. In some cases the packet characteristics include a version identifier, a packet or payload length, a traffic class, a flow label, etc. In some cases the payload data area 937 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 907 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 931, which in turn can be formatted into any one or more storage areas, and which can comprise parameterized storage 939 accessible by a key (e.g., filename, table name, block address, offset address, etc.).

Execution of the sequences of instructions to practice certain embodiments of the disclosure are performed by a single instance of the computer system 9A00. According to certain embodiments of the disclosure, two or more instances of computer system 9A00 coupled by a communications link 915 (e.g., LAN, PTSN, or wireless network) may perform the sequence of instructions required to practice embodiments of the disclosure using two or more instances of components of computer system 9A00.

The computer system 9A00 may transmit and receive messages such as data and/or instructions organized into a data structure (e.g., communications packets 938). The data structure can include program instructions (e.g., application code 903), communicated through communications link 915 and communications interface 914. Received program code may be executed by data processor 907 as it is received and/or stored in the shown storage device or in or upon any other non-volatile storage for later execution. Computer system 9A00 may communicate through a data interface 933 to a database 932 on an external data repository 931. Data items in a database can be accessed using a primary key (e.g., a relational database primary key).

The processing element partition 901 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 907. Some embodiments include one or more special-purpose hardware components (e.g., power control, logic, sensors, transducers, etc.). A module may include one or more state machines and/or combinational logic used to implement features for, or facilitate the performance of, characteristics of conflict remediation.

Various implementations of the database 932 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of recommendation of conflict resolution tools. Such files or records can be brought into and/or stored in volatile or non-volatile memory.

Figure 9B:
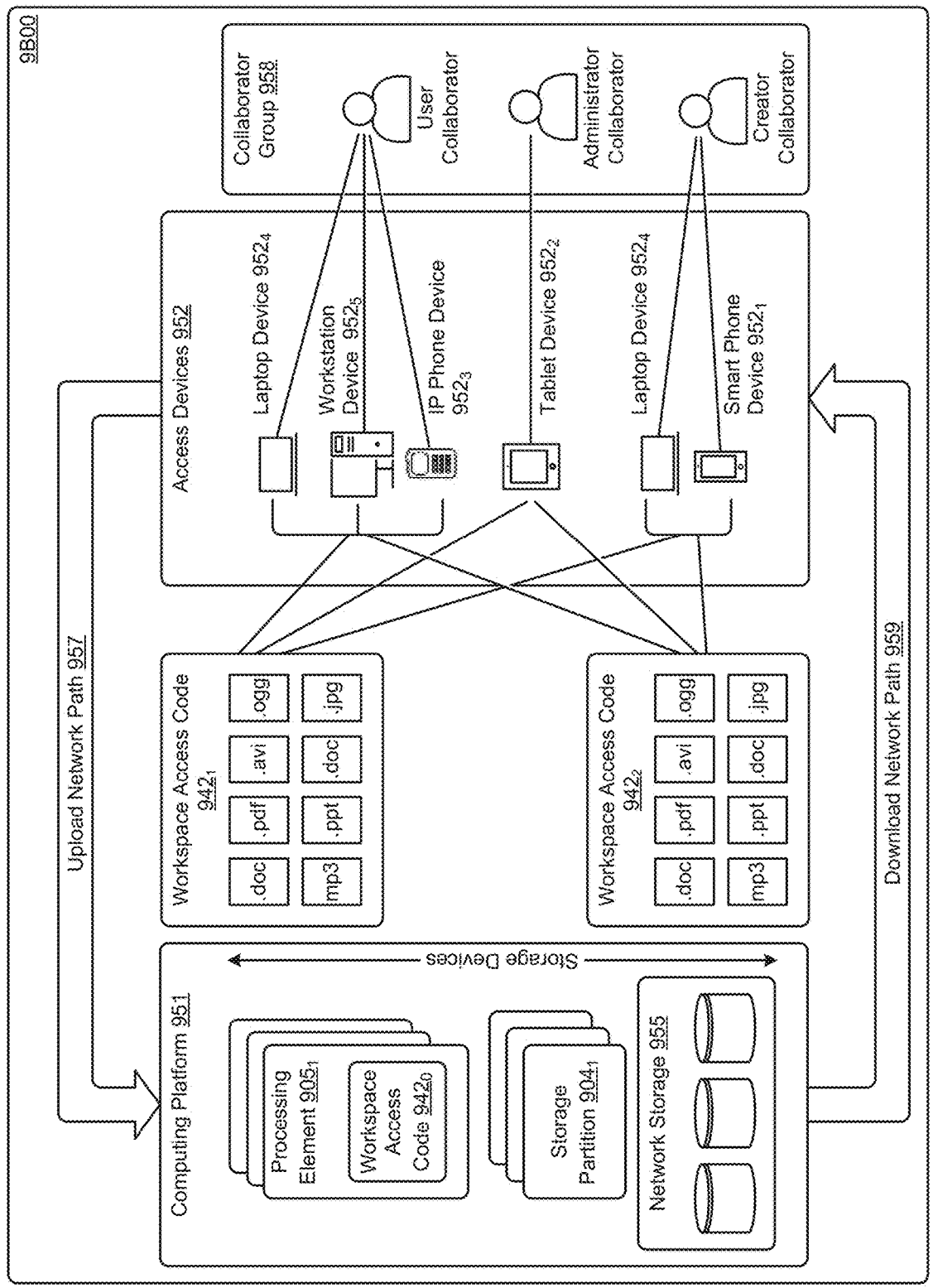

FIG. 9B depicts a block diagram of an instance of a cloud-based environment 9B00. Such a cloud-based environment supports access to workspaces through the execution of workspace access code (e.g., workspace access code $942_0$, workspace access code $942_1$, and workspace access code $942_2$) Workspace access code can be executed on any of the shown access devices 952 (e.g., laptop device $952_4$, workstation device $952_5$, IP phone device $952_3$, tablet device $952_2$, smart phone device $952_1$, etc.). A group of users can form a collaborator group 958, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Also, a portion of the workspace access code can reside in and be executed on any computing platform 951, including in a middleware setting. As shown, a portion of the workspace access code resides in and can be executed on one or more processing elements (e.g., processing element $905_1$). The workspace access code can interface with storage devices such the shown networked storage 955. Storage of workspaces and/or any constituent files or objects, and/or any other code or scripts or data can be stored in any one or more storage partitions (e.g., storage partition $904_1$). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 957). A stored workspace can be delivered to a particular user and/or shared with other particular users via a download (e.g., a download from a processing element to an access device over a download network path 959).

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings to be regarded in an illustrative sense rather than in a restrictive sense.

What is claimed is:

1. A method comprising:
identifying an object in a server in a cloud-based environment, wherein the server is configured to interface with a storage device that hosts shared objects accessible by two or more users;
granting to a first user, a first permission to modify a first instance of the object to be edited with a first editing tool with a first edit action;
granting to a second user, a second permission to modify a second instance of the object to be edited with a second editing tool with a second edit action, wherein the two or more users are editing the object at a same time;
detecting, by the server, an occurrence of an object modification event pertaining to the first instance or the second instance that corresponds to an object modification conflict, the object modification conflict corresponding to a modification of content of the object by both the first edit action and the second edit action that edit a same text at a same part of the object, wherein the first edit action and the second edit action are different edit actions performed on the same text of the object;
generating, by the server, a set of editing tools as options to address the object modification conflict, wherein a first option of the set of editing tools is the first editing tool comprising a first conflict resolution option for displaying the object modification conflict corresponding to the different edit actions performed on the same text at the same part of the object in the first editing tool and a second option of the set of editing tools is the second editing tool comprising a second conflict resolution option for displaying the object modification conflict corresponding to the different edit actions performed on the same text at the same part of the object in the second editing tool, and the first editing tool and the second editing tool are different types of editing tools provided by different tool vendors; and presenting the set of editing tools as options, wherein a selection of an option from among the set of editing tools is delivered to the server.

2. The method of claim 1, wherein the first edit action is a modification to the same text and the second edit action is a deletion of the same text at the same part of the object.

3. The method of claim 1, wherein generating the set of editing tools is based at least in part on at least one of a preference setting or a history log, where an indication in the preference setting or the history log that the first tool from a first tool vendor corresponds to a previous usage or to a preference causes the first tool to be presented as a first tool option in a tool menu, and where another indication in the preference setting or the history log that the second tool from a second tool vendor corresponds to a lesser usage or to a lesser preference causes the second tool to be presented as a second tool option in a tool menu.

4. The method of claim 1, wherein a first set of options is generated for the first user and a second set of options is generated for the second user, and the first set of options generated for the first user is different from the second set of options generated for the second user.

5. The method of claim 1, wherein the object modification event is at least one of, a save operation event, or an auto-save operation event, or a scroll away event, or a navigating event, or an expiration of an editing or session timeout period, or any combination thereof.

6. The method of claim 1, wherein the first editing tool is at least one of, a text editor tool, a web page editing tool, an image processing tool, or a spreadsheet editing tool.

7. The method of claim 1, wherein generating the set of editing tools uses a tool capability matrix having the different types of editing tools provided by the different tool vendors along a first axis and different tool resolution options for the different types of editing tools along a second axis.

8. The method of claim 7, wherein the tool capability matrix comprises at least one of, a text redline markup capability, a formatting redline markup capability, or a list markup capability, or a table markup capability, or a vector graphic markup capability, or a form redline capability, or an HTML element redline capability, or a scripting language markup capability, or any combination thereof.

9. The method of claim 1, wherein the set of editing tools selected as the options to address the modification conflict is selected on the basis of a given tool being the specific type of tool that was used to generate the object.

10. The method of claim 9, wherein the first editing tool is used to edit at least one of, a table, or a row, or a column, or a text item, or any combination thereof.

11. A computer program product, embodied in a non-transitory computer readable medium, the non-transitory computer readable medium having stored thereon a sequence of instructions which, when stored in memory and executed by a processor causes the processor to perform a set of acts, the set of acts comprising:
  identifying an object in a server in a cloud-based environment, wherein the server is configured to interface with a storage device that hosts shared objects accessible by two or more users;
  granting to a first user, a first permission to modify a first instance of the object to be edited with a first editing tool with a first edit action;
  granting to a second user, a second permission to modify a second instance of the object to be edited with a second editing tool with a second edit action, wherein the two or more users are editing the object at a same time;
  detecting, by the server, an occurrence of an object modification event pertaining to the first instance or the second instance that corresponds to an object modification conflict, the object modification conflict corresponding to a modification of content of the object by both the first edit action and the second edit action that edit a same text at a same part of the object, wherein the first edit action and the second edit action are different edit actions performed on the same text of the object;
  generating, by the server, a set of editing tools as options to address the object modification conflict, wherein a first option of the set of editing tools is the first editing tool comprising a first conflict resolution option for displaying the object modification conflict corresponding to the different edit actions performed on the same text at the same part of the object in the first editing tool and a second option of the set of editing tools is the second editing tool comprising a second conflict resolution option for displaying the object modification conflict corresponding to the different edit actions performed on the same text at the same part of the object in the second editing tool, and the first editing tool and the second editing tool are different types of editing tools provided by different tool vendors; and
  presenting the set of editing tools as options, wherein a selection of an option from among the set of editing tools is delivered to the server.

12. The computer program product of claim 11, wherein the first edit action is a modification to the same text and the second edit action is a deletion of the same text at the same part of the object.

13. The computer program product of claim 11, wherein generating the set of editing tools is based at least in part on at least one of a preference setting or a history log, where an indication in the preference setting or the history log that the first tool from a first tool vendor corresponds to a previous usage or to a preference causes the first tool to be presented as a first tool option in a tool menu, and where another indication in the preference setting or the history log that the second tool from a second tool vendor corresponds to a lesser usage or to a lesser preference causes the second tool to be presented as a second tool option in a tool menu.

14. The computer program product of claim 11, wherein a first set of options is generated for the first user and a second set of options is generated for the second user and the first set of options generated for the first user is different from the second set of options generated for the second user.

15. The computer program product of claim 11, wherein the object modification event is at least one of, a save operation event, or an auto-save operation event, or a scroll away event, or a navigating event, or an expiration of an editing or session timeout period, or any combination thereof.

16. The computer program product of claim 11, wherein the first editing tool is at least one of, a text editor tool, a web page editing tool, an image processing tool, or a spreadsheet editing tool.

17. The computer program product of claim 11, wherein generating the set of editing tools uses a tool capability matrix having the different types of editing tools provided by the different tool vendors along a first axis and different tool resolution options for the different types of editing tools along a second axis.

18. The computer program product of claim 17, wherein the tool capability matrix comprises at least one of, a text redline markup capability, a formatting redline markup capability, or a list markup capability, or a table markup capability, or a vector graphic markup capability, or a form redline capability, or an HTML element redline capability, or a scripting language markup capability, or any combination thereof.

19. A system comprising:
- a storage facility to store an object on a storage device in a cloud-based environment that hosts shared objects accessible by two or more users; and
- a server or servers that carry out acts of:
  - granting to a first user, a first permission to modify a first instance of the object to be edited with a first editing tool with a first edit action;
  - granting to a second user, a second permission to modify a second instance of the object to be edited with a second editing tool with a second edit action, wherein the two or more users are editing the object at a same time;
  - detecting, by the server, an occurrence of an object modification event pertaining to the first instance or the second instance that corresponds to an object modification conflict, the object modification conflict corresponding to a modification of content of the object by both the first edit action and the second edit action that edit a same text at a same part of the object, wherein the first edit action and the second edit action are different edit actions performed on the same text of the object;
  - generating, by the server, a set of editing tools as options to address the object modification conflict, wherein a first option of the set of editing tools is the first editing tool comprising a first conflict resolution option for displaying the object modification conflict corresponding to the different edit actions performed on the same text at the same part of the object in the first editing tool and a second option of the set of editing tools is the second editing tool comprising a second conflict resolution option for displaying the object modification conflict corresponding to the different edit actions performed on the same text at the same part of the object in the second editing tool, and the first editing tool and the second editing tool are different types of editing tools provided by different tool vendors; and
  - presenting the set of editing tools as options, wherein a selection of an option from among the set of editing tools is delivered to the server.

20. The system of claim 19, wherein the first edit action is a modification to the same text and the second edit action is a deletion of the same text at the same part of the object.

* * * * *